US012748365B2

(12) United States Patent
Toratani et al.

(10) Patent No.: US 12,748,365 B2
(45) Date of Patent: *Sep. 29, 2026

(54) IMAGE FORMING APPARATUS HAVING A PIPE TO SEND AIR TO AN AIR NOZZLE

(71) Applicant: CANON KABUSHIKI KAISHA, Tokyo (JP)

(72) Inventors: Yasuharu Toratani, Chiba (JP); Shutaro Saito, Tokyo (JP); Keisuke Yoshida, Chiba (JP); Yuya Yamada, Chiba (JP); Taku Ashida, Shizuoka (JP); Asuna Fukamachi, Chiba (JP); Shohei Tsuzaki, Chiba (JP); Yusuke Yamaguchi, Chiba (JP); Hiroshi Miyamoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,159

(22) Filed: Nov. 14, 2024

(65) Prior Publication Data

US 2025/0068103 A1 Feb. 27, 2025

Related U.S. Application Data

(62) Division of application No. 18/461,428, filed on Sep. 5, 2023, now Pat. No. 12,174,564.

(30) Foreign Application Priority Data

| | | |
|---|---|---|
| Oct. 17, 2022 | (JP) | 2022-166246 |
| Oct. 17, 2022 | (JP) | 2022-166248 |
| Oct. 17, 2022 | (JP) | 2022-166249 |

(51) Int. Cl.
*G03G 15/20* (2006.01)

(52) U.S. Cl.
CPC ..... *G03G 15/2017* (2013.01); *G03G 15/2053* (2013.01); *G03G 15/2064* (2013.01); *G03G 2215/2025* (2013.01)

(58) Field of Classification Search
CPC ........... G03G 15/2017; G03G 15/2053; G03G 15/2064; G03G 2215/2025
See application file for complete search history.

(56) References Cited

U.S. PATENT DOCUMENTS

| | | | | |
|---|---|---|---|---|
| 8,218,993 | B2 | 7/2012 | Kaji | G03G 15/2017 |
| 8,594,548 | B2 | 11/2013 | Takeshita et al. | G03G 15/2028 |
| 8,779,335 | B2 | 7/2014 | Saito | B21B 27/06 |
| 8,958,716 | B2 | 2/2015 | Saito | G03G 15/20 |
| 9,207,593 | B2 | 12/2015 | Fukamachi | G03G 15/20 |

(Continued)

FOREIGN PATENT DOCUMENTS

| | | |
|---|---|---|
| JP | S60-247672 | 12/1985 |
| JP | 2005-157179 A | 6/2005 |

(Continued)

*Primary Examiner* — Hoang X Ngo
(74) *Attorney, Agent, or Firm* — Venable LLP

(57) ABSTRACT

An image forming apparatus includes a first rotatable member, a second rotatable member, an air nozzle, and a pipe. The pipe includes a portion provided in a range overlapping with the first rotatable member and making one reciprocation or more in a case that when a direction crossing a feeding direction of a recording material fed in a nip is a widthwise direction of the first rotatable member, the pipe is viewed in a direction perpendicular to the widthwise direction.

13 Claims, 14 Drawing Sheets

(56) References Cited

U.S. PATENT DOCUMENTS

| | | | | |
|---|---|---|---|---|
| 9,291,991 | B2 | 3/2016 | Yoshida | G03G 15/16 |
| 9,310,724 | B2 | 4/2016 | Fukuda et al. | G03G 15/20 |
| 9,367,006 | B2 | 6/2016 | Yoshida et al. | G03G 15/20 |
| 9,389,554 | B2 | 7/2016 | Tanaka et al. | G03G 15/20 |
| 9,465,336 | B2 | 10/2016 | Saito et al. | G03G 15/20 |
| 9,563,163 | B2 | 2/2017 | Tanaka et al. | G03G 15/20 |
| 10,241,433 | B2 | 3/2019 | Tanaka et al. | G03G 15/20 |
| 10,241,455 | B2 | 3/2019 | Fukamachi et al. | G03G 15/20 |
| 10,274,877 | B2 | 4/2019 | Maeda et al. | G03G 15/20 |
| 10,379,471 | B2 | 8/2019 | Takematsu et al. | G03G 15/20 |
| 10,437,185 | B2 | 10/2019 | Yamaguchi et al. | G03G 15/20 |
| 10,452,006 | B2 | 10/2019 | Hashimoto et al. | G03G 15/20 |
| 10,545,442 | B1 | 1/2020 | Hirano et al. | G03G 15/20 |
| 10,564,578 | B2 | 2/2020 | Maeda et al. | G03G 15/20 |
| 10,627,751 | B2 | 4/2020 | Hasegawa et al. | G03G 15/20 |
| 10,768,569 | B2 | 9/2020 | Saito | G03G 15/00 |
| 10,802,430 | B2 | 10/2020 | Toratani et al. | G03G 15/20 |
| 10,859,953 | B2 | 12/2020 | Fukamachi et al. | G03G 15/20 |
| 10,877,412 | B2 | 12/2020 | Yashiro et al. | G03G 15/20 |
| 10,955,775 | B2 | 3/2021 | Kawai et al. | G03G 15/20 |
| 11,022,920 | B2 | 6/2021 | Kozuma et al. | G03G 15/20 |
| 11,194,275 | B2 | 12/2021 | Takemasa et al. | G03G 15/20 |
| 11,269,272 | B2 | 3/2022 | Tatezawa et al. | G03G 15/20 |
| 11,281,141 | B2 | 3/2022 | Toratani et al. | G03G 15/20 |
| 11,294,313 | B2 | 4/2022 | Hasegawa et al. | G03G 15/20 |
| 11,300,904 | B2 | 4/2022 | Kawai et al. | G03G 15/20 |
| 11,300,906 | B2 | 4/2022 | Takemasa et al. | G03G 15/20 |
| 11,347,169 | B2 | 5/2022 | Saito et al. | G03G 15/20 |
| 11,474,464 | B2 | 10/2022 | Tanaka et al. | G03G 15/20 |
| 11,609,526 | B2 | 3/2023 | Saito | G03G 15/00 |
| 11,714,370 | B2 | 8/2023 | Saito et al. | G03G 15/20 |
| 2013/0051826 | A1 | 2/2013 | Chiyoda | G03G 15/2028 |
| 2017/0010568 | A1 | 1/2017 | Kozuma | |
| 2022/0308508 | A1 | 9/2022 | Hasegawa et al. | |
| 2024/0126194 | A1 | 4/2024 | Saito et al. | G03G 15/2028 |

FOREIGN PATENT DOCUMENTS

| | | | |
|---|---|---|---|
| JP | 2007-094327 | | 4/2007 |
| JP | 2007-187715 | A | 7/2007 |
| JP | 2007-187791 | | 7/2007 |
| JP | 2011-257670 | | 12/2011 |
| JP | 2012-123289 | | 6/2012 |
| JP | 2017-21107 | A | 1/2017 |
| JP | 2022-151989 | A | 10/2022 |

(a)

(b)

IMAGE FORMING APPARATUS HAVING A PIPE TO SEND AIR TO AN AIR NOZZLE

CROSS-REFERENCE TO RELATED APPLICATIONS

This application is a division of U.S. application Ser. No. 18/461,428 filed Sep. 5, 2023; and claims priority under 35 U.S.C. § 119 to Japan Application JP2022-166249 filed in Japan on Oct. 17, 2022, to Japan Application JP2022-166248 filed in Japan on Oct. 17, 2022, and to Japan Application JP2023-166246 filed in Japan on Oct. 17, 2022; and the contents of all of which are incorporated herein by reference as if set forth in full.

FIELD OF THE INVENTION AND RELATED ART

The present invention relates to an image forming apparatus such as a copying machine, a printer, a facsimile machine, or a multi-function machine having a plurality of functions of these machines.

The image forming apparatus includes a fixing device for fixing a toner image, carried on a recording material, on the recording material. In the fixing device, the toner image on the recording material is fed while being heated in a nip between a fixing member and a nip-forming member. At this time, there is a liability that the recording material is stuck to the fixing member and is not peeled off from the recording material. For this reason, in order to peel off the recording material from the fixing member, a constitution provided with a nozzle for blowing air to a leading end of the recording material is proposed (Japanese Laid-Open Patent Application Nos. Sho60-247672 and 2007-94327).

Here, in the case of the constitution in which the recording material is peeled off from the fixing member by blowing the air to the recording material, the toner image on the recording material is cooled by the air blown from the nozzle in some instances. The cooled toner image changes in glossiness depending on a temperature for cooling the toner image, and therefore, there is a liability that uneven glossiness occurs on the toner image.

SUMMARY OF THE INVENTION

A principal object of the present invention is to provide an image forming apparatus capable of suppressing an occurrence of uneven glossiness on a toner image in a constitution in which a recording material is peeled off from a fixing member by blowing air to the recording material.

According to an aspect of the present invention, there is provided an image forming apparatus comprising: a first rotatable member configured to heat a toner image formed on a recording material; a second rotatable member configured to form a nip in contact with the first rotatable member, wherein the second rotatable member applies heat and pressure to the recording material, on which the toner image is carried, in the nip in cooperation with the first rotatable member to fix the toner image on the recording material; an air nozzle configured to blow air toward the recording material and the first rotatable member on a side downstream of the nip with respect to a feeding direction of the recording material; and a pipe configured to send air to the air nozzle and opposing the first rotatable member, wherein the pipe includes a portion provided in a range overlapping with the first rotatable member and making one reciprocation or more in a case that when a direction crossing the feeding direction of the recording material fed in the nip is a widthwise direction of the first rotatable member, the pipe is viewed in a direction perpendicular to the widthwise direction.

Further features of the present invention will become apparent from the following description of exemplary embodiments with reference to the attached drawings.

Figure 4:
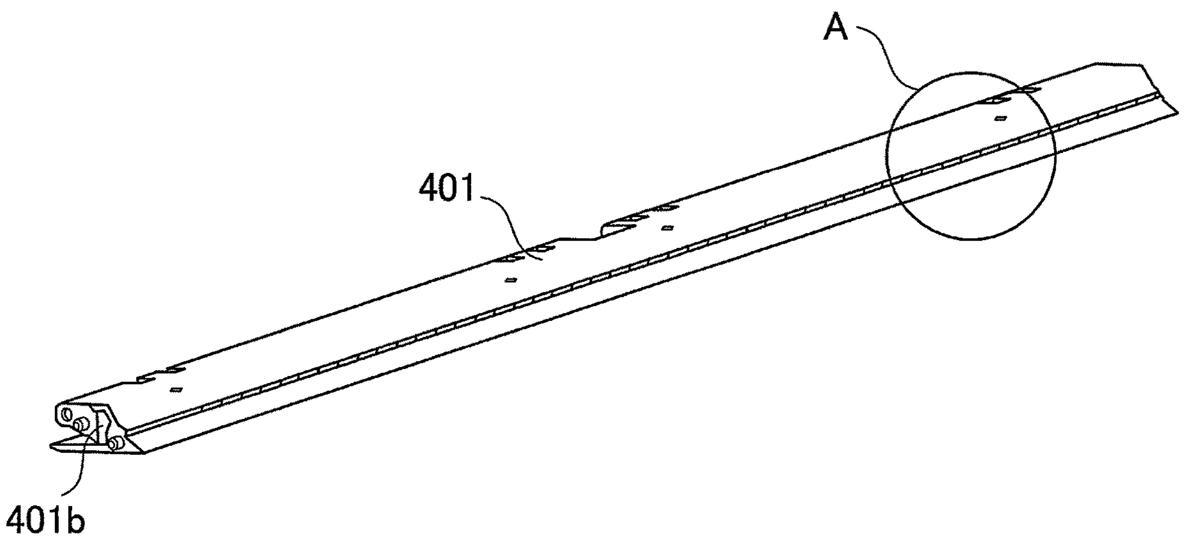
Figure 4:
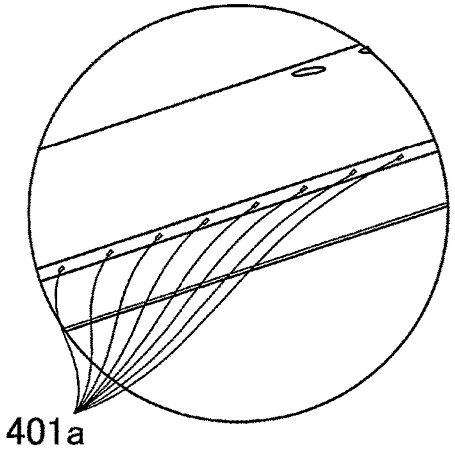

Part (a) of FIG. 4 is a perspective view of the air nozzle in the first embodiment, and part (b) of FIG. 4 is an enlarged view of an A portion of part (a) of FIG. 4.

Figure 5:
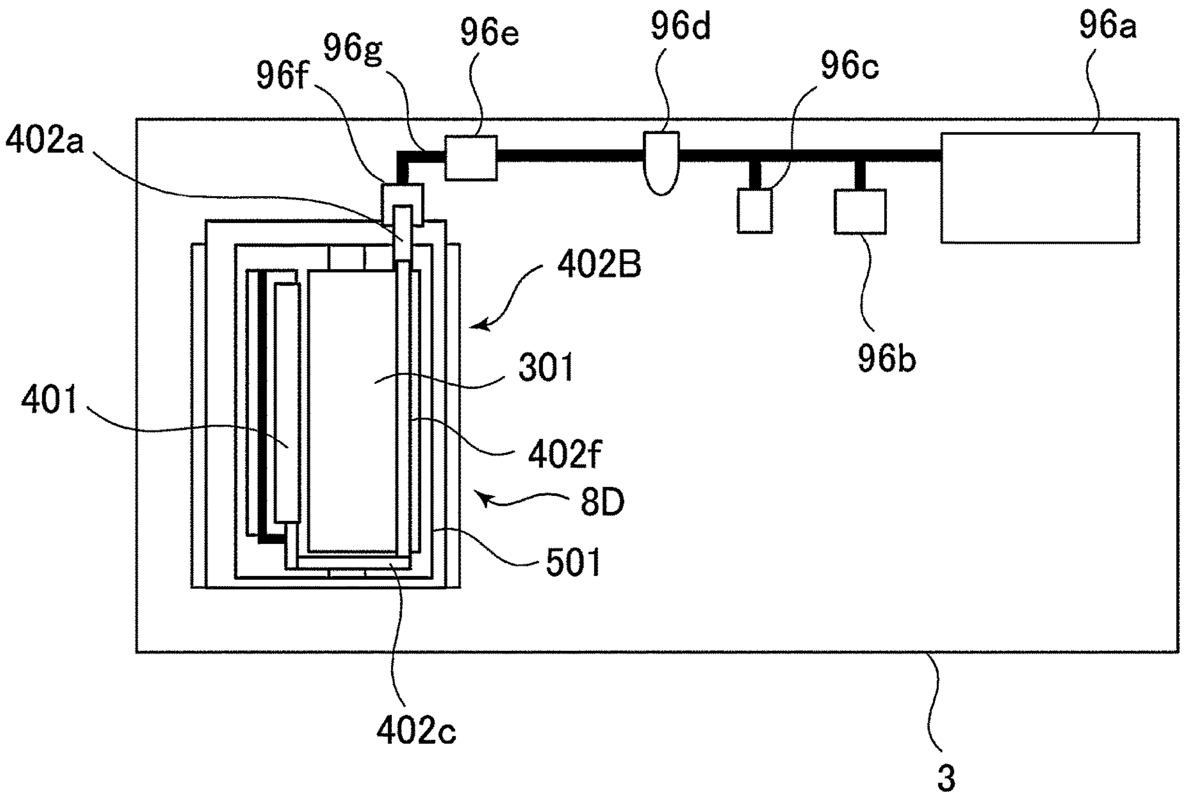

FIG. 5 is a schematic view of a passage from an air compressor to the air nozzle in the first embodiment as viewed from above.

Figure 6:
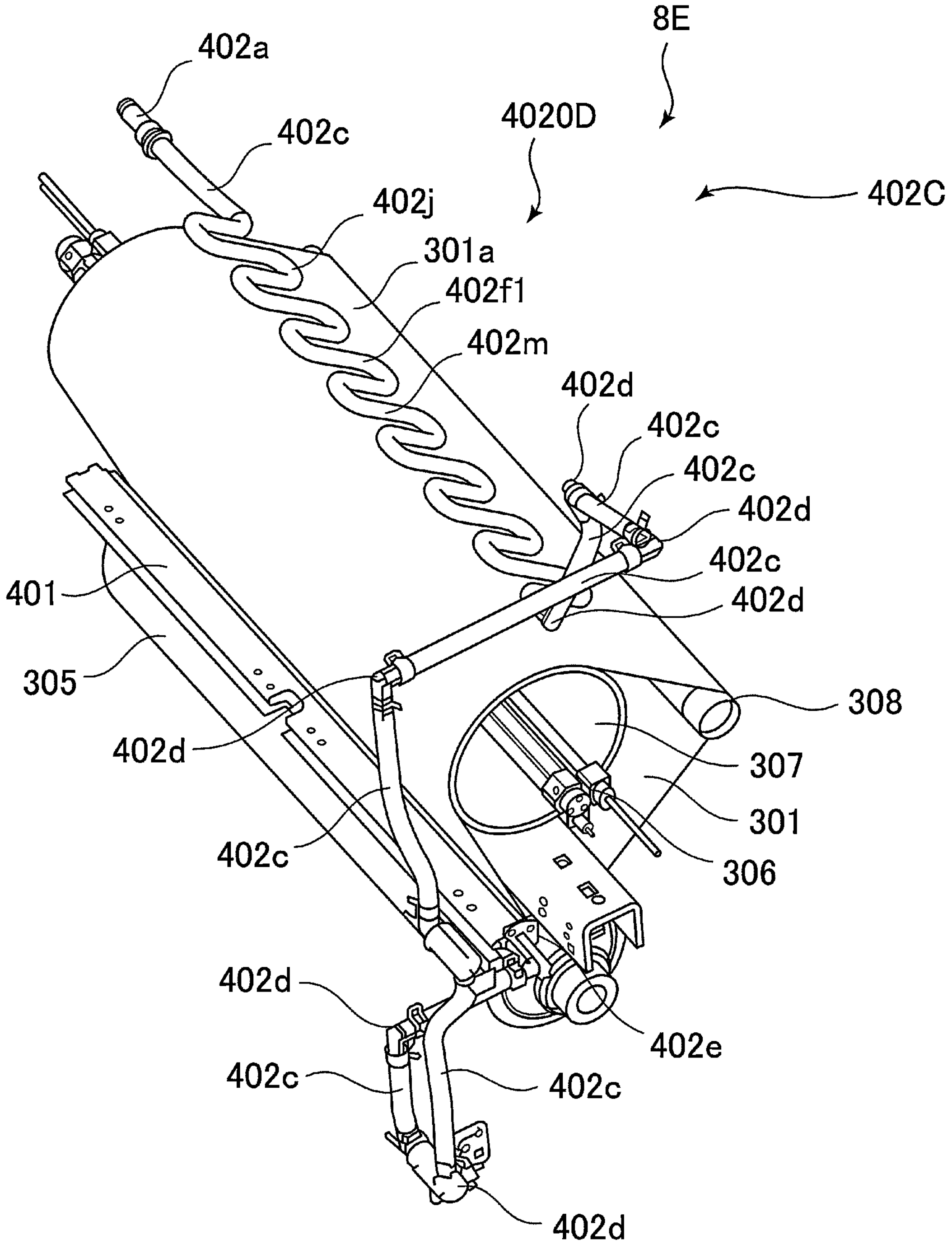

FIG. 6 is a perspective view of a fixing device, an air nozzle, and an air passage in another first embodiment of the first embodiment.

Figure 7:
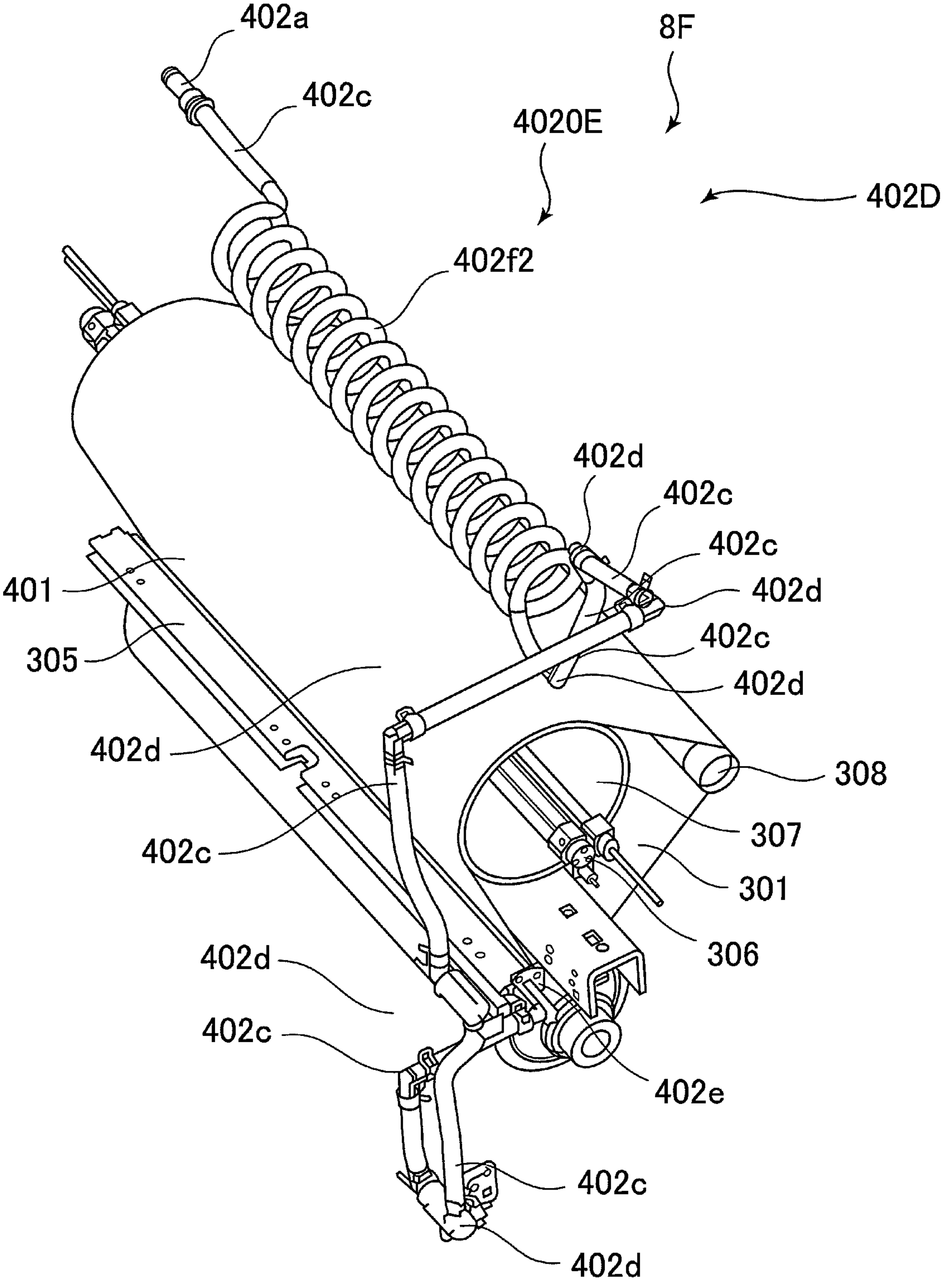

FIG. 7 is a perspective view of a fixing device, an air nozzle, and an air passage in another second embodiment of the first embodiment.

Figure 8:
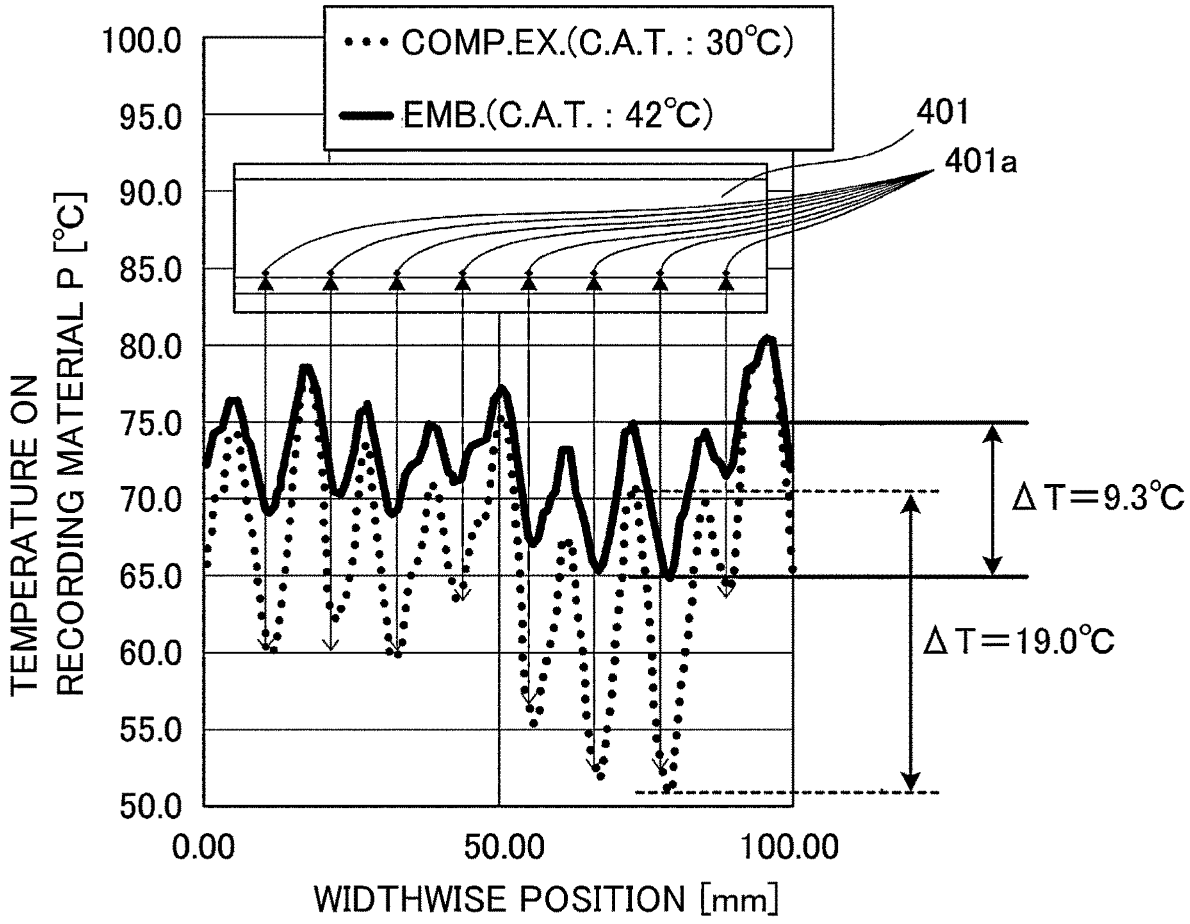

FIG. 8 is a graph showing a temperature distribution on a recording material in each of an embodiment and a comparison example.

Figure 9:
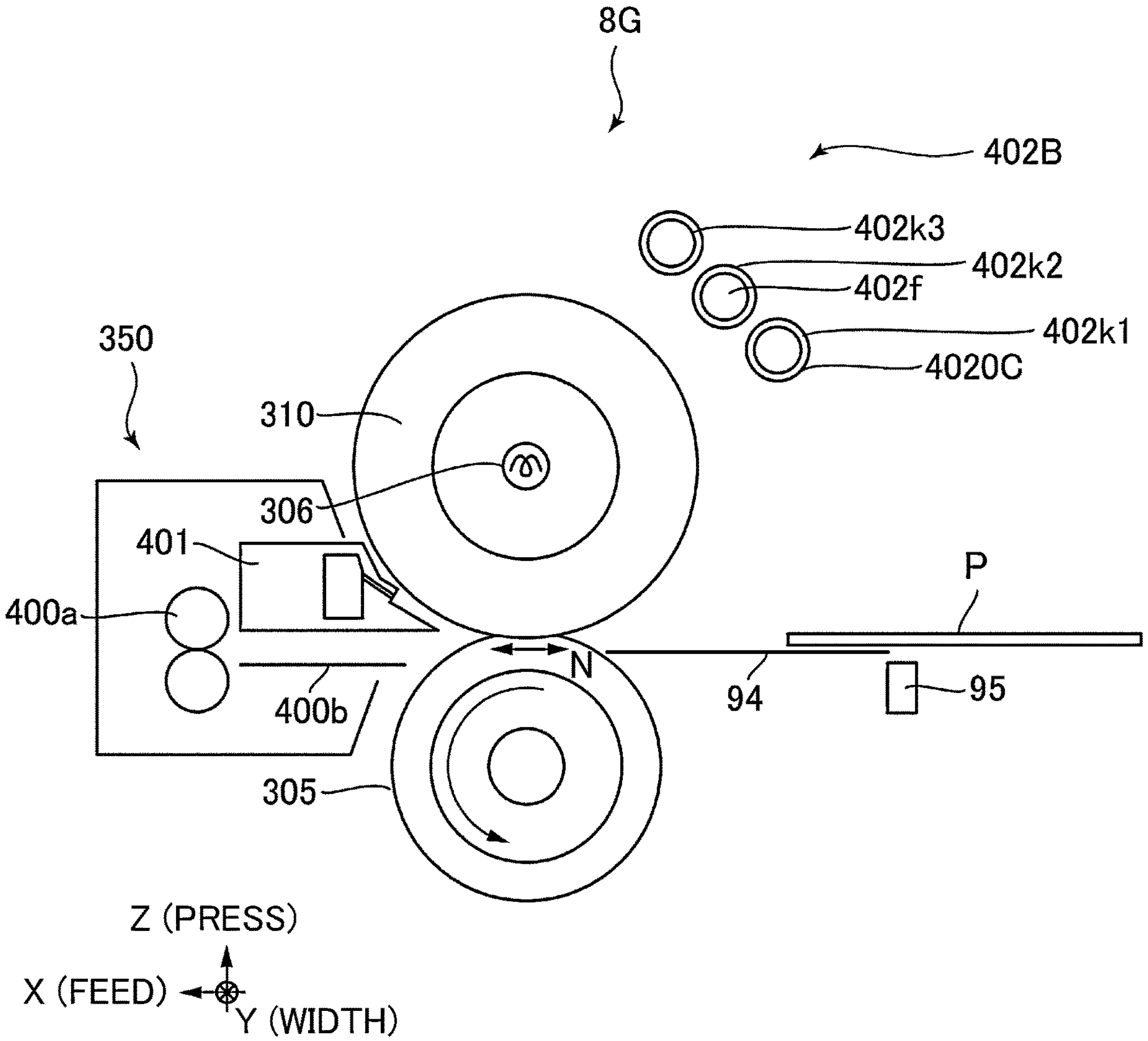

FIG. 9 is a schematic sectional view of a fixing device in a second embodiment.

Figure 10:
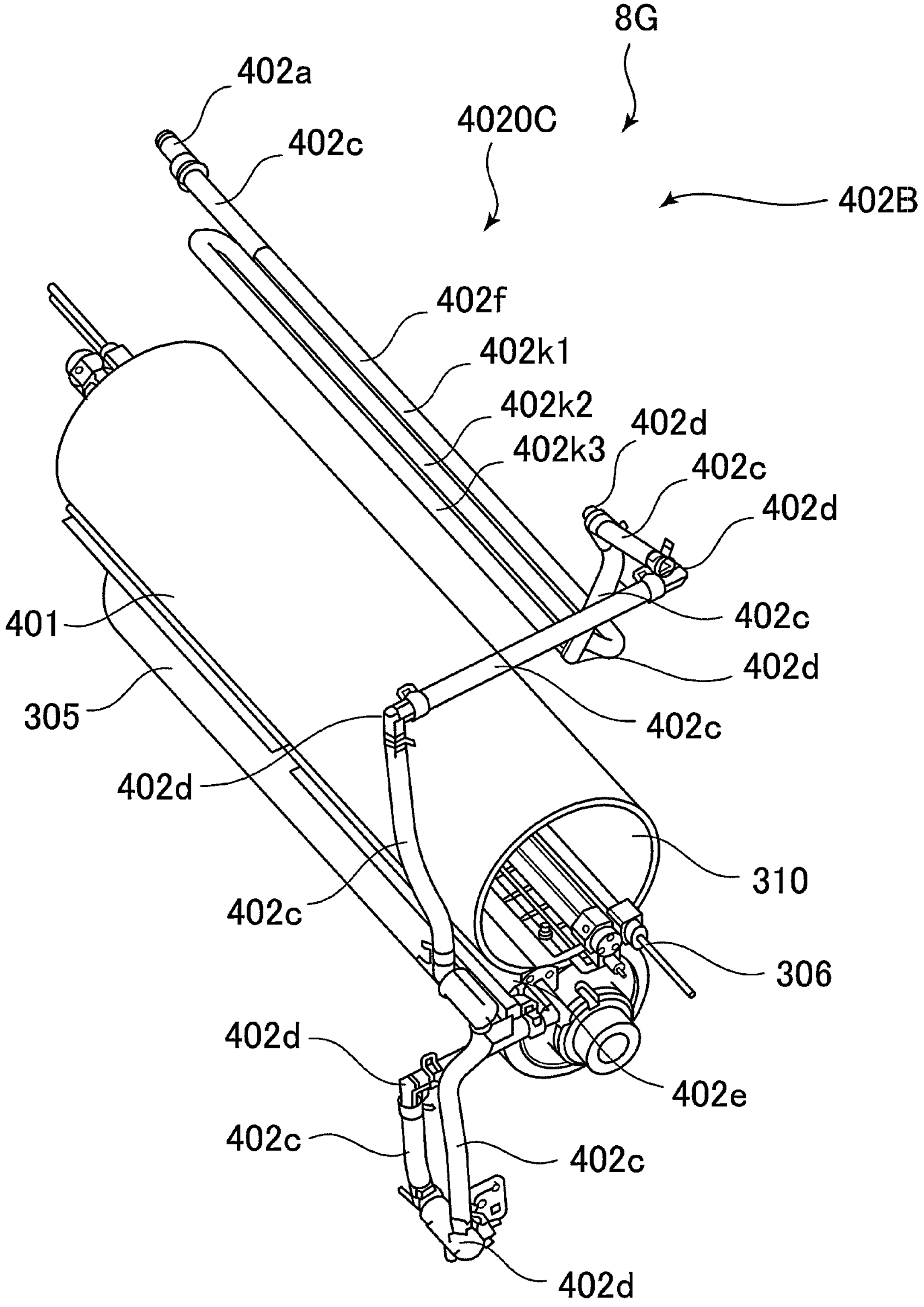

FIG. 10 is a perspective view of the fixing device, an air nozzle, and an air passage in the second embodiment.

Figure 11:
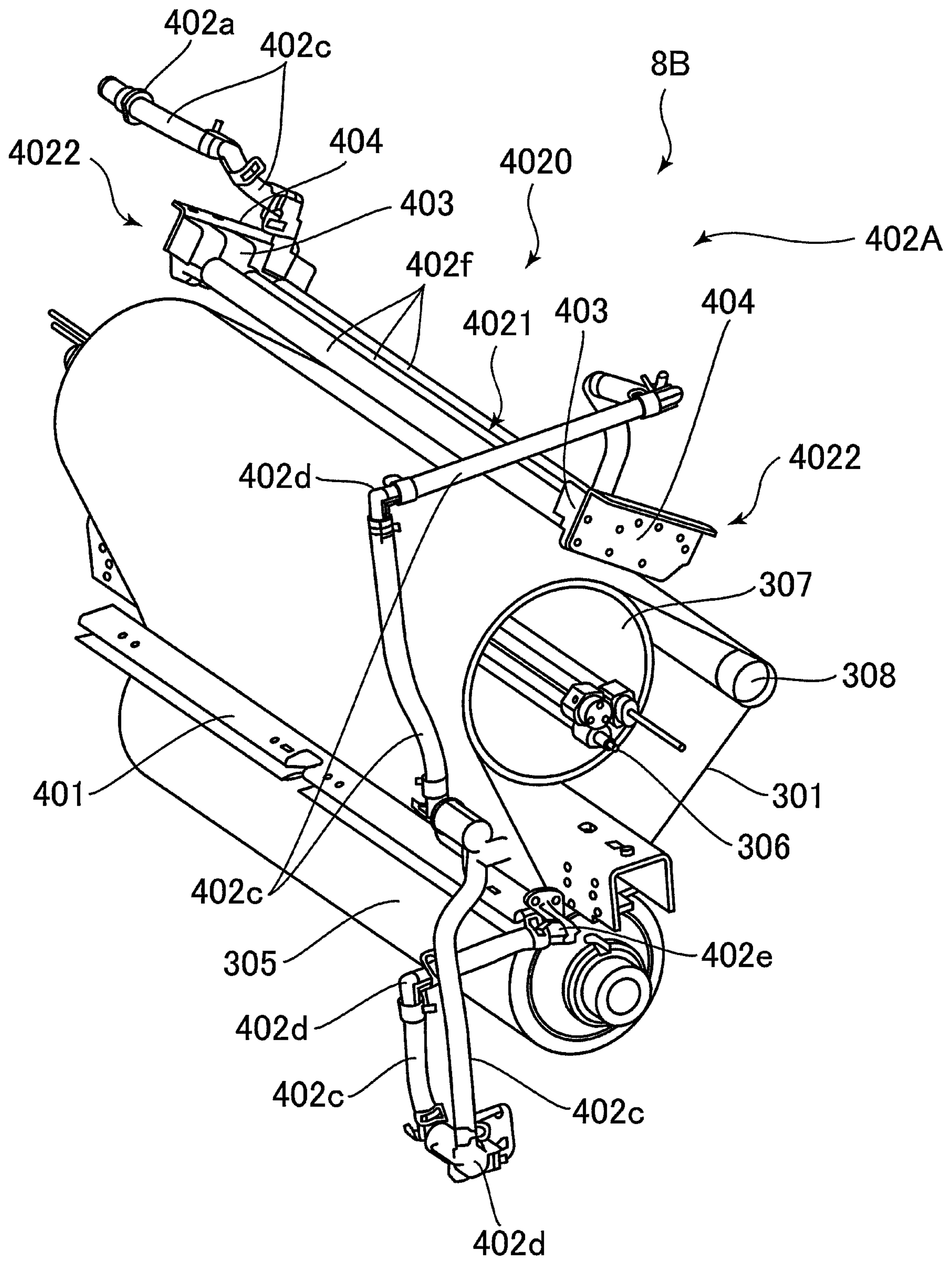

FIG. 11 is a perspective view of the fixing device, an air nozzle, and an air passage in a third embodiment.

Figure 12:
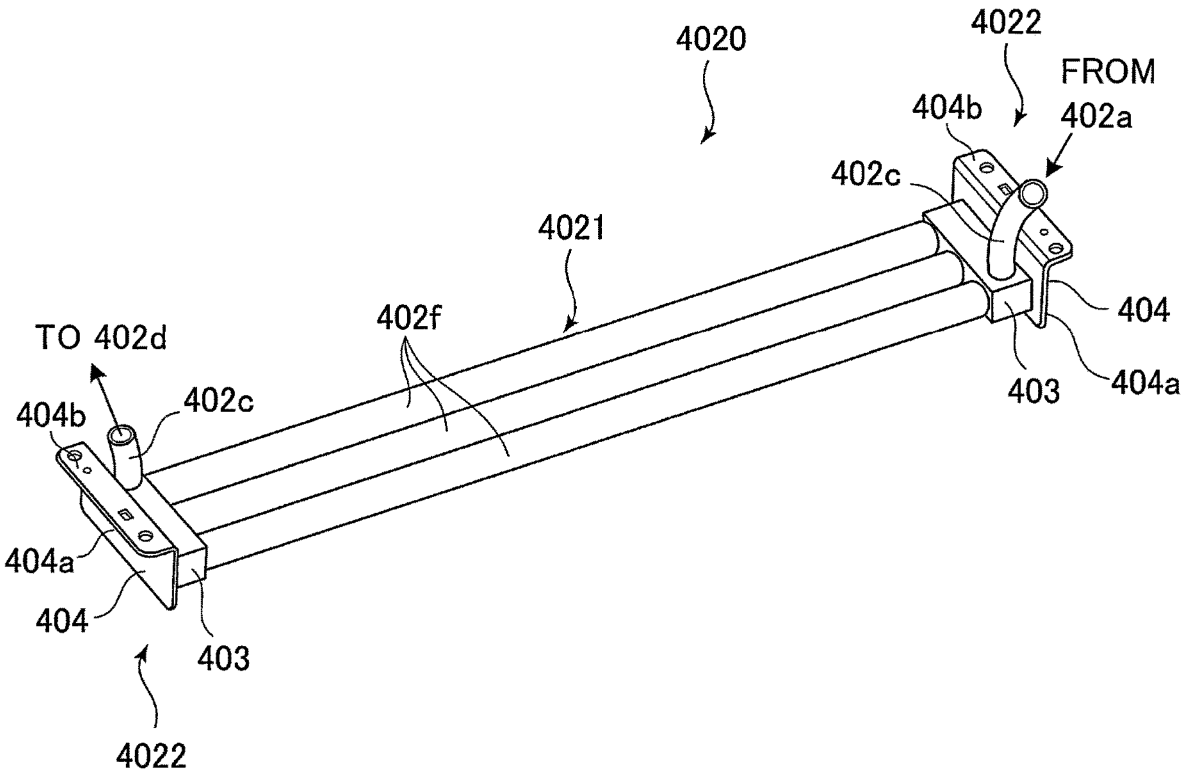

FIG. 12 is a perspective views of an air heating portion in the third embodiment.

Figure 13:
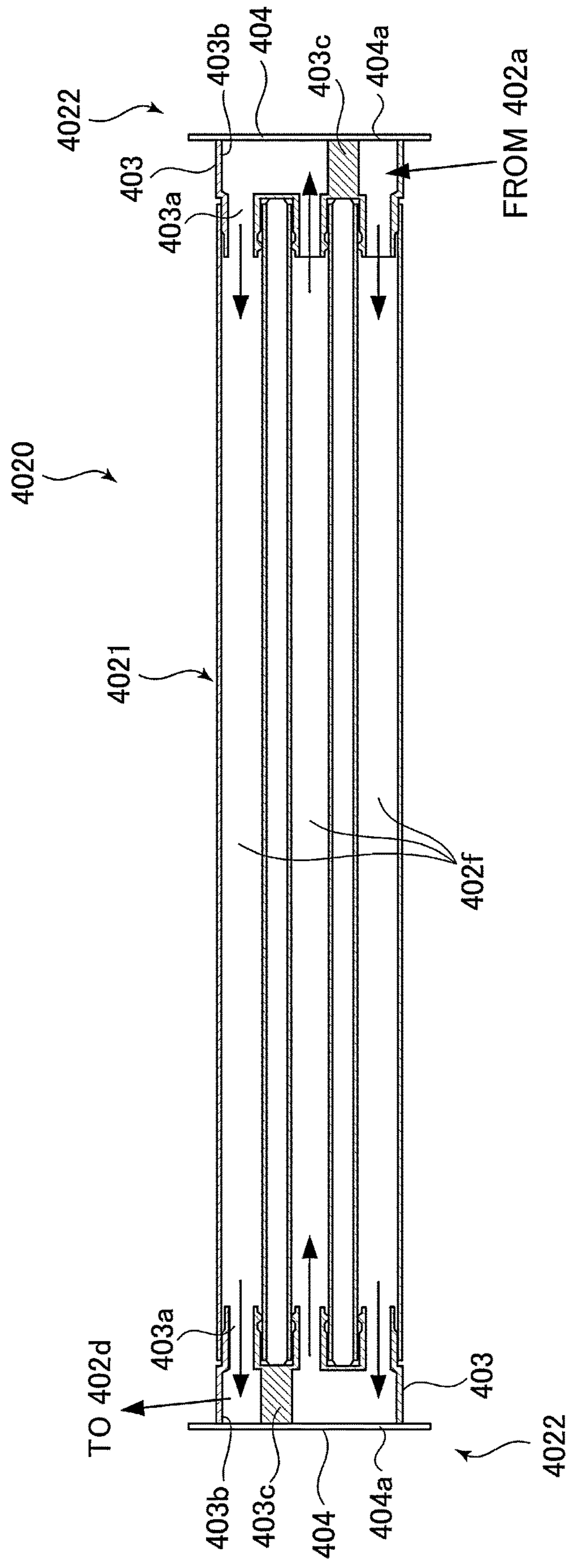

FIG. 13 is a sectional view of the air heating portion the third embodiment.

Figure 14:
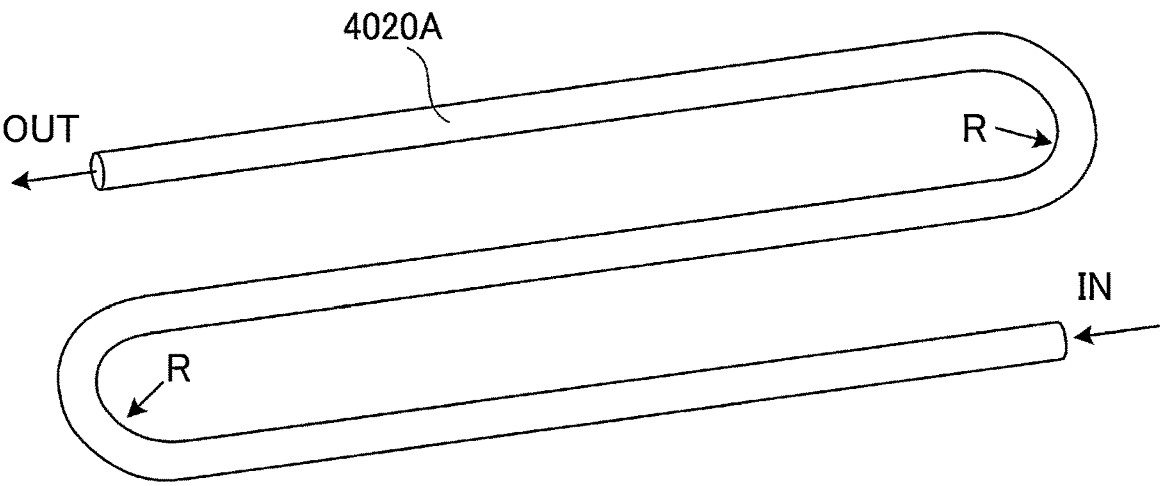

FIG. 14 is a perspective view of an air heating portion in a comparison example 1.

Figure 15:
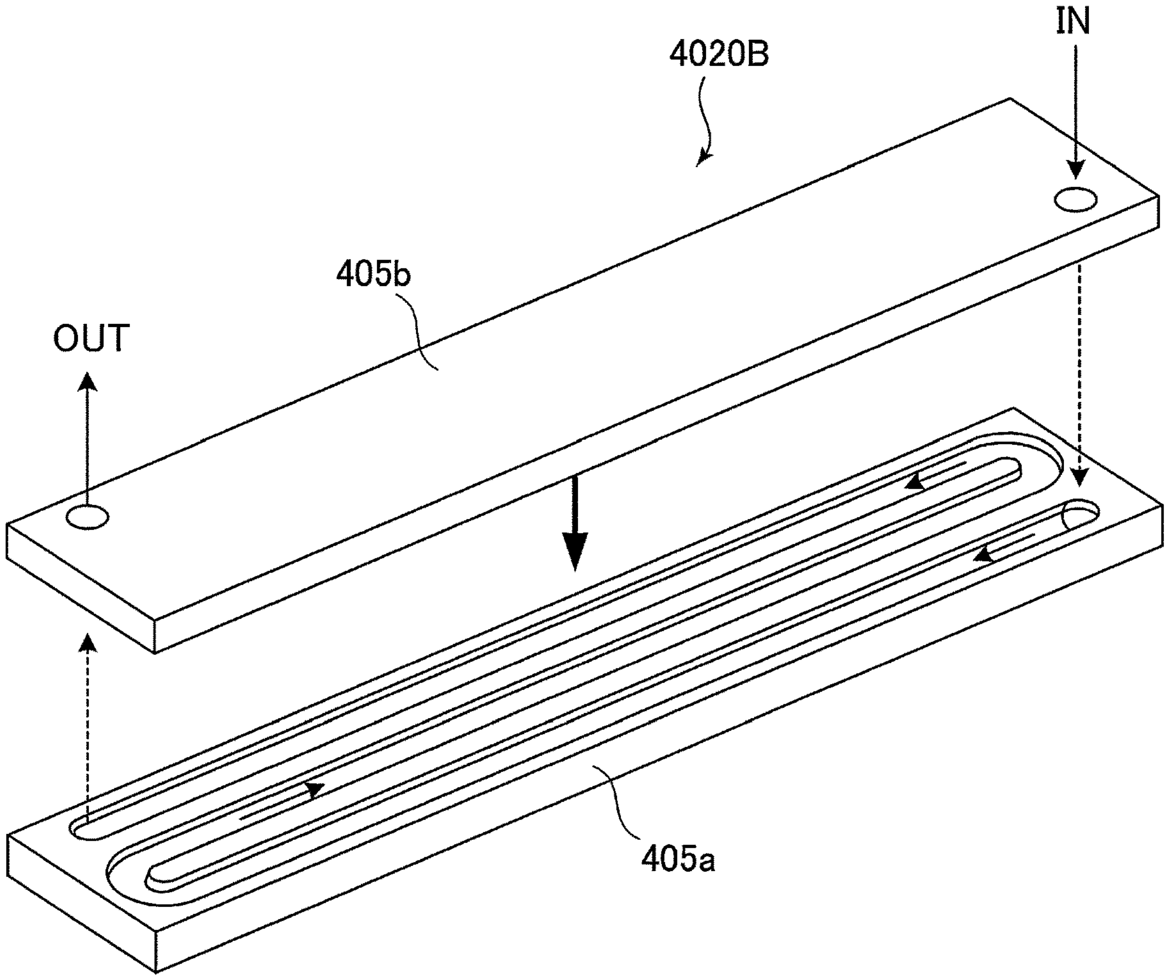

FIG. 15 is a perspective view of an air heating portion in a comparison example 2.

DESCRIPTION OF THE EMBODIMENTS

First Embodiment

A first embodiment of the present invention will be described using FIGS. 1 to 8. First, a general structure of the image forming apparatus according to this embodiment will be described using FIG. 1.

[Image Forming Apparatus]

An image forming apparatus 1 is an electrophotographic full-color printer including four image forming portions Pa, Pb, Pc and Pd provided correspondingly to four colors of yellow, magenta, cyan and black. In this embodiment, the image forming apparatus 1 is of a tandem type in which the image forming portions Pa, Pb, Pc and Pd are disposed along a rotational direction of an intermediary transfer belt 204 described later. In this embodiment, the image forming apparatus 1 forms, on a recording material, a toner image (image) depending on an image signal, an image reading portion (original reading device) 2 connected to an image forming apparatus main assembly 3, or from a host device, such as a personal computer, communicatably connected to an image forming apparatus main assembly 3. As the recording material, it is possible to cite a sheet material such as a sheet, a plastic film or a cloth.

The image forming apparatus 1 includes the image reading portion 2 and the image forming apparatus main assembly 3. The image reading portion reads an original placed on an original supporting platen glass 21, and light emitted from a light source 22 is reflected by the original and is formed in an image on a CCD sensor 24 through an optical system member 23 such as a lens. Such an optical system unit converts the original into an electric signal data stream (string) for each of lines by scanning the original with the light in an arrow direction. An image signal obtained by the CCD sensor 24 is sent to the image forming apparatus main assembly 3, and then subjected to image processing for an associated one of the image forming portions by a controller 30 as described later. Further, the controller 30 also receives external input as the image signal from an external host device such as a print server.

The image forming apparatus main assembly 3 include a plurality of image forming portions Pa, Pb, Pc and Pd, and in each of the image forming portions, image formation is carried out on the basis of the above-described image signal. That is, the image signal is converted into a laser beam subjected to PWM (pulse width modulation) control by the controller 30. A polygon scanner 31 as an exposure device scans each of photosensitive drum surfaces with the laser beam. Thus, photosensitive drums 200*a* to 200*d* as image bearing members of the respective image forming portions Pa to Pd are irradiated with the laser beams.

Incidentally Pa is the image forming portion for yellow (Y), Pb is the image forming portion for magenta (M), Pc is the image forming portion for cyan (C) and Pd is the image forming portion for black (Bk), and these portions form images of associated colors. The image forming portions Pa to Pd have the substantially same structure, and therefore, in the following, the image forming portion Pa for Y is described in detail and other image forming portions will be omitted from description. In the image forming portion Pa, on the surface of the photosensitive drum 200*a*, a toner image is formed on the basis of the image signal as described below.

Here, the toner used in this embodiment contains (incorporates), as a parting agent, a wax comprising paraffin or polyolefin, or silicone oil. Specifically, in this embodiment, toner in which a wax component and a pigment are finely dispersed inside pulverized toner is used. Incidentally, a constitution in which polymerization toner containing the wax component is used may be employed. In the following description, as an example, wax is used as the parting agent, but even in the case where the silicone oil is used as described above, the same description is applied. That is, in this embodiment, in addition to the wax, the silicone oil is also included in the wax component.

A charging roller 201*a* as a primary charger electrically charges the surface of the photosensitive drum 200*a* to a predetermined potential to prepare for electrostatic latent image formation. An electrostatic latent image is formed on the surface of the photosensitive drum 200*a* charged to the predetermined potential, by irradiation with the laser beam from the polygon scanner 31. A developing device 202*a* develops the electrostatic latent image on the photosensitive drum 200*a*, so that the toner image is formed. A primary transfer roller 203*a* transfers the toner image from the photosensitive drum 200*a* onto the intermediary transfer belt 204 under application of a primary transfer bias of an opposite polarity to a charge polarity of toner by electrically discharging the intermediary transfer belt 204 from a back surface (side). The surface of the photosensitive drum 200*a* after the transfer is cleaned by a cleaner 207*a*.

Further, the toner image on the intermediary transfer belt 204 is fed to a subsequent image forming portion, so that in the order of Y, M, C and Bk, the respective color toner images successively formed in the associated image forming portions are transferred, and thus the four-color toner images are formed on the surface of the intermediary transfer belt 204. Then, the toner images passed through the image forming portion Pd for Bk positioned on a most downstream side with respect to a rotational direction of the intermediary transfer belt 204 are fed to a secondary transfer portion constituted by a secondary transfer roller pair 205 and 206. Then, in the secondary transfer portion, the toner images are secondary-transferred from the intermediary transfer belt 204 onto the recording material under application of a secondary transfer electric field of an opposite polarity to the charge polarity of the toner images.

The recording material is accommodated in a cassette 9, and the recording material fed from the cassette 9 is fed to a registration portion 208 constituted by, for example, a pair of registration rollers and awaits at the registration portion 208. Thereafter, the registration portion 208 is subjected to timing control for aligning the toner images on the intermediary transfer belt 204 with the sheet (recording material), and then the recording material is fed to the secondary transfer portion.

The recording material on which the toner images are transferred at the secondary transfer portion is fed to a fixing device 8D, in which the toner images are heated and pressed, so that the toner images carried on the recording material are fixed on the recording material. The recording material passed through the fixing device 8D is discharged onto a discharge tray 7. Incidentally, in the case where images are formed on double surfaces (sides) of the recording material, when transfer and fixation of the toner image onto a first surface (front surface) of the recording material are ended, the recording material is turned upside down by being fed through a reverse feeding portion 10, and transfer and fixation of the toner image onto a second surface (back surface) of the recording material are carried out, so that the recording material is stacked on the discharge tray 7.

Incidentally, the controller 30 carries out control of entirety of the image forming apparatus 1 as described above. Further, the controller 30 is capable of making various settings on the basis of input from an operating portion 4 of the image forming apparatus 1. Such a controller 30 includes a CPU (Central Processing Unit), a ROM (Read Only Memory) and a RAM (Random Access Memory). The CPU carries out control of respective portions while reading programs which are stored in the ROM and which correspond to control procedures. Further, in the RAM, operation data and input data are stored, and the CPU carries out the control by making reference to the data stored in the RAM, on the basis of the above-described programs or the like.

[Fixing Device]

Figure 1:
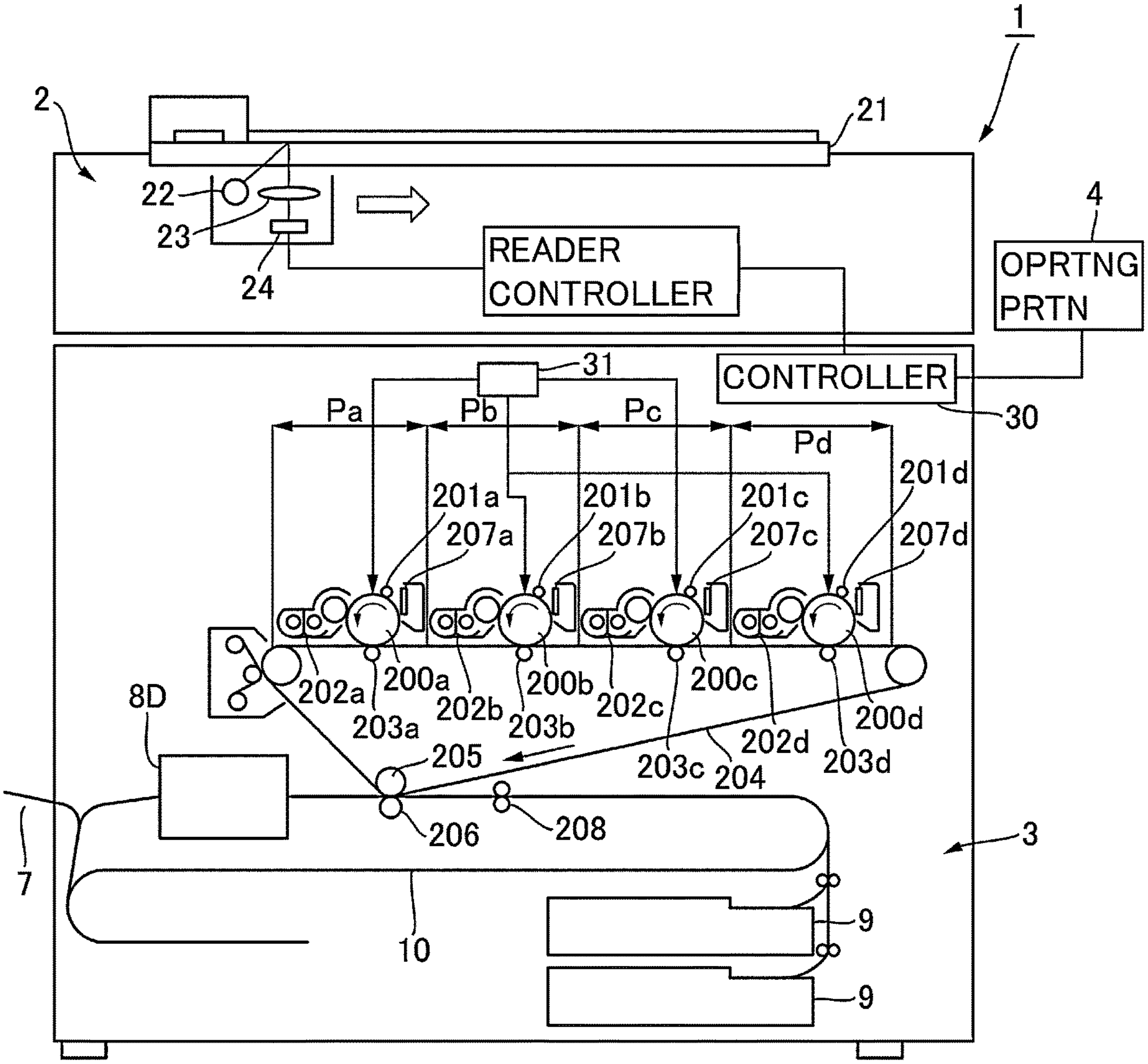
FIG. 1 is a schematic sectional view of an image forming apparatus according to a first embodiment.
Figure 2:
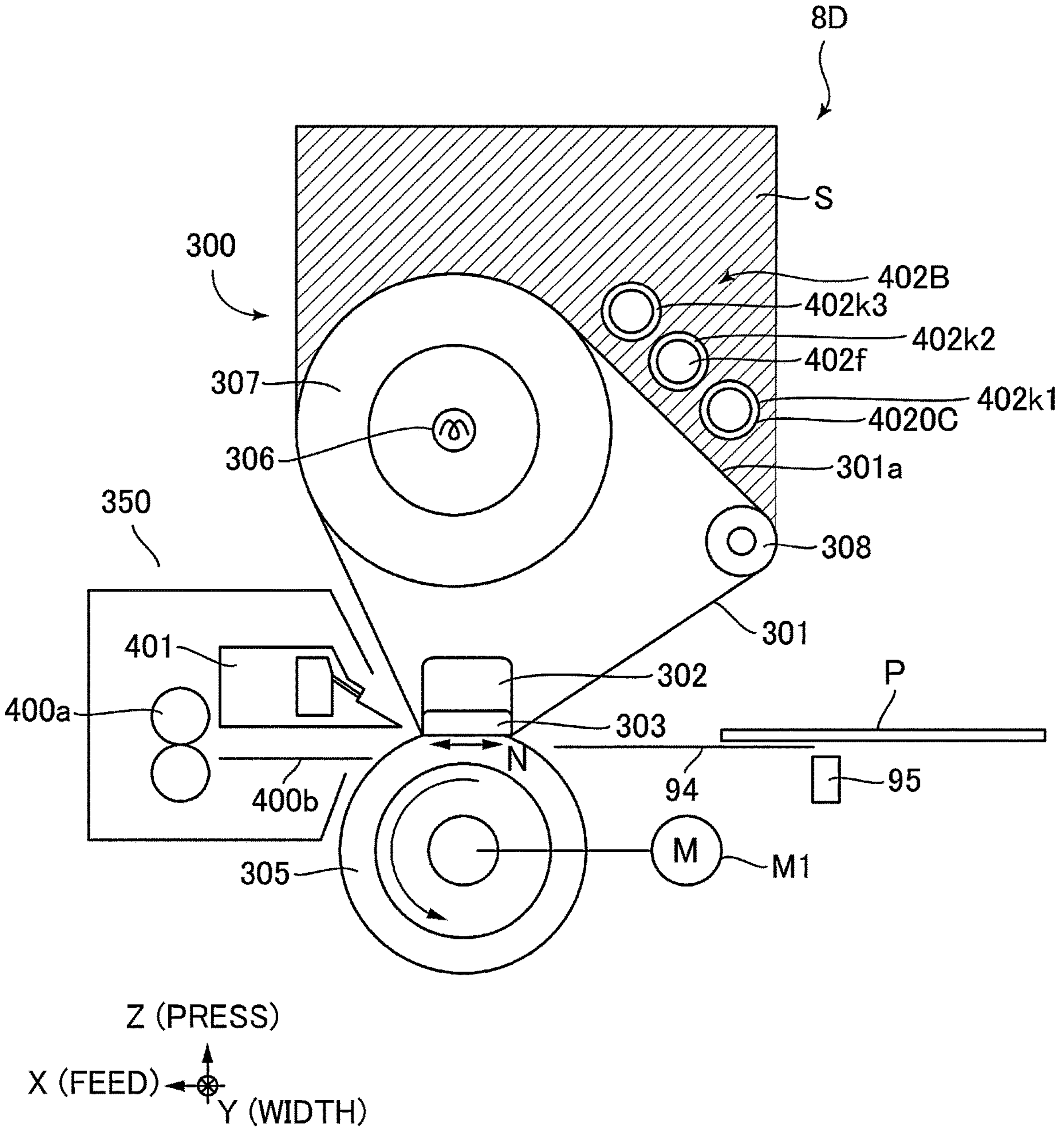
FIG. 2 is a schematic sectional view of a fixing device in the first embodiment.

Next, a structure of the fixing device 8D in this embodiment will be described using FIG. 2. FIG. 2 is a schematic sectional view showing a general structure of the fixing device 8D. In this embodiment, a fixing device of a belt heating type using an endless belt is employed. In FIG. 2, X direction is a feeding direction of the recording material P, Y direction is a widthwise direction crossing (in this embodiment, perpendicular to) the feeding direction of the recording material P, and Z direction is a pressing direction of a pressing roller 305. These directions are perpendicular to each other. Further, one side of the widthwise direction (Y direction) is a front side of the image forming apparatus 1, and is, for example, a side where the operating portion 4 is provided, and a user operates the operating portion 4.

The fixing device 8D includes a heating unit 300 including a fixing belt 301 as an endless rotatable belt and a pressing roller 305 as a nip forming member, contacting the fixing belt 301, for forming a nip in cooperation with the fixing belt 301, and as a rotatable pressing member.

The heating unit 300 includes the above-described fixing belt 301, a fixing pad 303 as a pad member, a heating roller 307, and a steering roller 308. The pressing roller 305 rotates in contact with an outer peripheral surface of the fixing belt 301 and is also rotatable driving member for imparting a driving force to the fixing belt 301.

The fixing belt 301 as a fixing member and a rotatable member has a heat conductive property, a heat resistant property and the like, and has a thin cylindrical shape. In this embodiment, the fixing belt 301 has a three-layer structure consisting of a base layer, an elastic layer formed on an outer peripheral surface of the base layer, and a parting layer formed on an outer peripheral surface of the elastic layer. The base layer is 80 μm in thickness and a polyimide (PI) resin material is used. The elastic layer is 300 μm in thickness and a silicone rubber material is used. The parting layer is 30 μm in thickness and PFA (polytetrafluoroethylene-perfluoroalkoxyethylene copolymer) resin material is used. Such a fixing belt 301 is stretched by the fixing pad 303, the heating roller 307 and the steering roller 308.

The fixing pad 303 is not only disposed inside the fixing belt 301 so as to oppose the pressing roller 305 through the fixing belt 301. The fixing pad 303 forms a nip N in which the recording material is nipped and fed between the fixing belt 301 and the pressing roller 305. In this embodiment, the fixing pad 303 is a substantially plate-like member long along the widthwise direction (a longitudinal direction crossing the rotational direction of the fixing belt 301, rotational axis direction of the heating roller 307) of the fixing belt 301. The fixing pad 303 is pressed against the fixing belt 301 toward the pressing roller 305, so that the nip N is formed. As a material of the fixing pad 303, an LCP (liquid crystal polymer) is used.

The fixing pad 303 is supported by a stay 302, as a supporting member made of metal, provided inside the fixing belt 301. That is, the stay 302 is disposed on a side opposite from the pressing roller 305 with respect to the fixing pad 303 and supports the fixing pad 303. Such a stay 302 is a reinforcing member which is long along the longitudinal direction of the fixing belt 301 and which has rigidity. The stay 302 contacts the fixing pad 303 and supports the fixing pad 303. That is, the stay 302 imparts strength to the fixing pad 303 and ensures a pressing force in the nip N when the fixing pad 303 is pressed by the pressing roller 305.

Between the fixing pad 303 and the fixing belt 301, an unshown lubrication sheet is interposed. Further, onto an inner peripheral surface of the fixing belt 301, a lubricant is applied, so that the fixing belt 301 smoothly slides on the lubrication sheet covering the fixing pad 303. As the lubricant, silicone oil is used.

The heating roller 307 as a first roller is disposed inside the fixing belt 301 and stretches the fixing belt 301 in cooperation with the fixing pad 303 and the steering roller 308. The heating roller 307 is formed of metal such as aluminum or stainless steel in a cylindrical shape, and in which a halogen heater 306 as a heating portion for heating the fixing belt 301 is provided. Further, the heating roller 307 is heated up to a predetermined temperature by the halogen heater 306.

In this embodiment, the heating roller 307 is formed with, for example, a stainless-steel pipe of 1 mm in thickness. Further, the halogen heater 306 may also be a single halogen heater, but a plurality of halogen heaters may be used. Incidentally, the heating portion is not limited to the halogen heater, but may also be another heater, such as a carbon heater, capable of heating the heating roller 307. The fixing belt 301 is heated by the heating roller 307 heated by the halogen heater 306 and is controlled at a predetermined target temperature depending on a kind of the recording material, on the basis of temperature detection by an unshown thermistor.

The steering roller 308 is disposed inside the fixing belt 301 and stretches the fixing belt 301 in cooperation with the fixing pad 303 and the heating roller 307, and is rotated by the fixing belt 301. The steering roller 308 is tilted relative to a rotational axis direction (widthwise direction longitudinal direction) of the heating roller 307, and thus controls a position (shift position) of the fixing belt 301 with respect to this rotational axis direction. That is, the steering roller 308 includes a rotation center in the center or on one end side of the steering roller 308 with respect to the rotational axis direction (longitudinal direction) and swings about this rotation center, so that the steering roller 308 tilts with respect to the longitudinal direction of the heating roller 307. By this, a difference in tension is generated between one side and the other side of the fixing belt 301 with respect to the longitudinal direction, so that the fixing belt 301 is moved in the longitudinal direction.

The fixing belt 301 shifts to either one of opposite end portions thereof during rotation due to outer diameter accuracy of the roller for stretching the fixing belt 301 and alignment accuracy between the respective rollers. For this reason, the shift of the fixing belt 301 is controlled by the steering roller 308. Incidentally, the steering roller 308 may also be swung by a driving source such as a motor, or a constitution in which the fixing belt 301 is swung by self-alignment may also be employed.

Further, in the case of this embodiment, the steering roller 308 is also tension roller which is urged by a spring supported by a frame of the heating unit 300 and which imparts predetermined tension to the fixing belt 301. Further, the steering roller 308 is formed in a cylindrical shape by metal such as aluminum or stainless steel. In this embodiment, the steering roller 308 is a stainless-steel pipe which is 20 mm in outer diameter. The steering roller 308 may also be provided with a rubber material at a surface thereof in order to enhance a gripping force.

The pressing roller 305 rotates in contact with the outer peripheral surface of the fixing belt 301 and imparts a driving force to the fixing belt 301. In this embodiment, the pressing roller 305 is a roller prepared by forming an elastic layer on an outer peripheral surface of a shaft and then by forming a parting layer on an outer peripheral surface of the elastic layer. The shaft is formed of stainless steel of 72 mm in diameter. The elastic layer is formed in a thickness of 8 mm with an electroconductive silicone rubber. The parting layer is formed in a thickness of 100 μm with PFA (tetrafluoroethylene-perfluoroalkoxyethylene copolymer) as a fluorine-containing resin material. The pressing roller 305 is supported by a fixing frame (not shown) of the fixing device 8D so as to be rotatable, and to one end portion thereof, a gear is fixed. The pressing roller 305 is connected to a motor M as a pressing roller driving source and is rotationally driven.

The thus-constituted fixing device 8D heats the toner image while nipping and feeding the toner image-carrying recording material P in the nip N formed between the fixing belt 301 and the pressing roller 305. Then, the toner image is fixed on the recording material P. Therefore, the fixing device 8D is required to compatibly realize a function of applying heat and pressure and a function of feeding the recording material P. The pressing roller 305 is pressed against the fixing belt 301 toward the fixing pad 303 by an unshown driving source. In this embodiment, a pressing force (NF) in the nip N during image formation is 1600N, and setting was made so that a length of the nip N in the X direction (feeding direction) was 24.5 mm, and a length of the nip N in the Y direction (widthwise direction) was 326 mm.

Further, on a side downstream of the nip N with respect to the feeding direction of the recording material P, a discharging unit 350 for discharging the recording material P, passed through the nip N, to an outside of the fixing device 8. In the discharging unit 350, an air nozzle 401, a discharging roller pair 400*a*, and a lower separating guide 400 are provided. The air nozzle 401 as a nozzle blows air (compressed air) for peeling off the recording material P from the fixing belt 301. Specifically, the air nozzle 401 is disposed downstream of the nip N with respect to the feeding direction of the recording material P (hereinafter, simply referred to as a "feeding direction") and above the nip N with respect to the vertical direction, and blows air toward an upstream side of the feeding direction and blow the nip with respect to the vertical direction. Then, the recording material P is peeled off from the fixing belt 301 by blowing the air to a neighborhood of a leading end of the recording material P after passing through the nip N.

The lower separation guide 400*b* is disposed on a side downstream of the nip with respect to the recording material feeding direction and below the nip N with respect to the vertical direction, so that a tip thereof is close to and opposes the neighborhood of the nip N of the pressing roller 305. Then, in the case where the recording material P is stuck to the pressing roller 305, the lower separation guide 400 peels off the recording material P from the pressing roller 305. Further, the lower separation guide 400*b* supports a lower surface of the recording material P discharged from the nip N, and guides this recording material P to the discharging roller pair 400*a*. The discharging roller pair 400*a* discharges the recording material P, discharged from the nip N, to an outside of the fixing device 8D. In this embodiment, the discharging roller pair 400*a* is disposed on a side downstream of the nip N by about 40 mm with respect to the feeding direction.

Further, on a side upstream of the nip N of the fixing device 8D with respect to the feeding direction, a guiding portion 94 for guiding the recording material P to the nip N, and a detecting sensor 95 for detecting the recording material P immediately in front of the nip N are provided. The controller 30 causes the detecting sensor 95 to detect a timing when the recording material P enters the nip N.

Further, the fixing device 8D includes a cover (not shown) for covering at least above the fixing belt 301 with respect to the vertical direction. In this embodiment, the cover is disposed so as to cover a part of a periphery including an upper part of the fixing belt 301 and a part of an air passage 402B described later. Such a cover constitutes a part of a casing 501 (FIG. 5) of the fixing device 8D in which the heating unit 300, the pressing roller 305, and the discharging unit 350 are accommodated.

[Air Nozzle and Air Passage]

Figure 3:
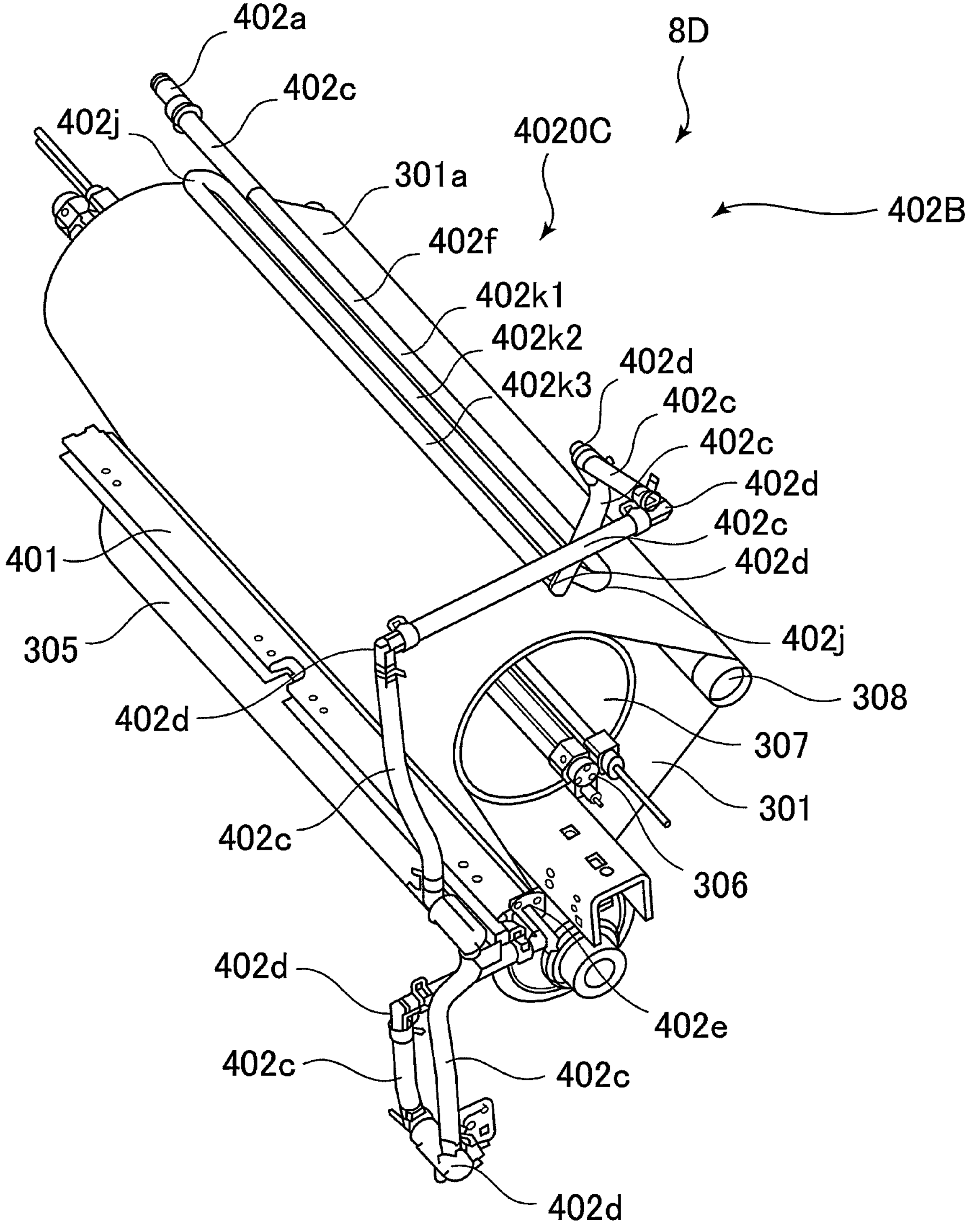
FIG. 3 is a perspective view of the fixing device, an air nozzle, and an air passage in the first embodiment.

Next, the air nozzle 401 and the air passage 402B will be specifically described using FIGS. 3 to 5 while making reference to FIG. 2. The air nozzle 401 is a member, made of an aluminum alloy, disposed opposed to the fixing belt 301 so that a longitudinal direction thereof if a direction along the widthwise direction of the fixing belt 301 as shown in FIG. 3. The air nozzle 401 is provided with about 30 to 50 nozzle holes 401*a* each of about 0.5 to 1.0 mm in diameter, which open at a surface thereof opposing the fixing belt 301 as shown in parts (a) and (b) of FIG. 4. Then, compressed air generated by an air compressor 96*a* passes through the air passage 402B and is guided to a space inside the air nozzle 401 through an air nozzle inlet opening 401*b* provided in the air nozzle 401, so that the compressed air is discharged from the nozzle holes 401*a*. The air nozzle inlet opening 401*b* opens at one end portion of the air nozzle 401 with respect to the longitudinal direction of the air nozzle 401.

The air passage 402B as a flow passage member is disposed inside the casing 501 of the fixing device 8D as shown in FIGS. 3 and 5. The air passage 402B includes, as shown in FIG. 3, a fixing-side coupler 402*a*, an air heating portion 4020C, an air tube 402*c*, a tube joint 402*d*, an air pipe 402*e*, and the like.

The fixing-side coupler 402*a* is provided at an entrance of the air passage 402B and is a coupling member for piping detachably mountable to a main assembly-side coupler 96*f* described later in order to supply the compressed air, supplied from the air compressor 96*a* described later, into the air passage 402B. The air heating portion 4020C as a part of the flow passage member is provided with the fixing-side coupler 402*a* mounted thereto at one end portion thereof. At the other end portion of the air heating portion 4020C, a plurality of tube joints 402*c* and a plurality of air tubes 402*c* are connected, so that the air passage 402B which is a series of air flow passages is formed. On a most downstream side of the air passage 402B, the air pipe 402*e* is mounted to the air passage 402 and is connected to the air nozzle inlet opening 401*b* provided in the air nozzle 401. The thus-constituted air passage 402B guides the compressed air, caused to flow into the air passage 402, to a space inside the air nozzle 401 through the piping member 402*f* and the air tubes 402*c*.

Each of the air tubes 402*c* is a rubber tube of about φ9 mm in inner diameter and about 1 mm in thickness, formed of a heat-resistant material such as a silicone rubber, for example. The air heating portion 4020C includes the piping member 402*f* bent as specifically described later. The piping member 402*f* is a cylindrical pipe made (formed) of metal. That is, the piping member 402*f* is, as described later, provided above the fixing belt 301 and is heated by the fixing belt 301. For this reason, in order to efficiently conduct radiation heat, from the fixing belt 301, to the compressed air flowing through inside the piping member 402*f*, the piping member 402*f* is made of metal high in thermal conductivity. In this embodiment, the piping member 402*f* is made of an aluminum alloy. Incidentally, the piping member 402*f* may also be a rubber tube similarly as the air tube 402*c*.

The tube joint 402*d* is formed of, for example, an aluminum alloy or a heat-resistant resin. The tube joint 402*d* is a component part for bending the flow passage, and is disposed between the air heating portion 4020C and the air tube 402*c* or between two air tubes 402*c*, so that the air tube 402*c* can be extended in various directions without being bent and buckled.

FIG. 5 is a schematic view of a passage from the air compressor 96*a* to the air nozzle 401 inside the image forming apparatus 1 as viewed from above. Inside the image forming apparatus main assembly 3 of the image forming apparatus 1, the air compressor 96*a*, a piping tube 96*g*, a pressure releasing electromagnetic valve 96*b*, a pressure adjusting valve 96*c*, an air filter 96*b*, a blowing electromagnetic valve 96*e*, the main assembly-side coupler 96*f*, and the like are provided.

The air compressor 96*a* generates the compressed air. The piping tube 96*g* connects the air compressor 96*a* with the air passage 402B provided inside the casing 501 of the fixing device 8D. The pressure releasing electromagnetic valve 96*b* is used to release the pressure in the piping tube 96*g*. The pressure adjusting valve 96*c* adjusts and maintain the pressure in the piping tube 96*g* to predetermined pressure. The air filter 96*d* separates and removes a drain, dust, and waste in the piping tube 96*g*. The blowing electromagnetic valve 96*e* is a valve for performing an operation for blowing the compressed air to a leading end of the recording material P by sending the compressed air into the air nozzles 401. The main assembly-side coupler 96*f* is a coupling member connected to the fixing-side coupler 402*a*. By such a constitution, the air generated by the air compressor 96*a* and passed through the piping tube 96*g* is supplied to the above-described air passage 402B.

The air blowing operation is performed in the following manner. First, after the air compressor 96*a* is started up, the pressure releasing electromagnetic valve 96*b* is closed, so that the compressed air with a pressure adjusted by the pressure adjusting valve 96*c* is accumulated inside the piping tube 96*g* to the blowing electromagnetic valve 96*e*. In this embodiment, the pressure adjusting valve 96*c* is adjusted so that the pressure in the piping tube 96*g* becomes 0.2 to 0.3 MPa.

When the recording material P is sent to the fixing device 8D, the detecting sensor 95 detects the leading end of the recording material P. On the basis of a timing at that time, after a lapse of a predetermined time, the blowing electromagnetic valve 96*e* is opened, so that the compressed air accumulated in the piping tube 96*b* is blown to the leading end of the recording material P and thus the recording material P is peeled off from the fixing belt 301.

Such blowing of the compressed air is carried out in a range of about 90 mm from the leading end of the recording material P. That is, in a period in which the recording material P of which leading end passed through the nip N is separated from the fixing belt 301 by about 90 mm, i.e., in a period in which the leading end of the recording material P moves about 90 mm from an exit of the nip N, the air blowing form the air nozzle 401 is performed. This is because there is a liability that air pressure in the piping tube 96*g* cannot be sufficiently increased until separation of a subsequent recording material when the blowing period is long and that the recording material cannot be sufficiently separated when the blowing period is short.

For example, in the case where a length of separation of the recording material P from the fixing belt 301 is 150 mm or more, the air is continuously blown from the air nozzles 401 for a longer time than in the case where the length of the separation is 90 mm, so that there is a liability that a time when the air is compressed for separating a subsequent recording material from the fixing belt 301 is not enough. This length of 150 mm is a length of a minimum-size recording material with respect to the feeding direction on which the image is capable of being formed by the image forming apparatus 1. On the other hand, for example, in the case where the length in which the recording material P is separated from the fixing belt 301 is 40 mm, separating power becomes in sufficient. This length of 40 mm is a length from the exit of the nip N to the discharging pair 400*a*. In this embodiment, by blowing the air from the air nozzles 401 until the recording material P is nipped by the discharging roller pair 400*a*, it is possible to suppress that an intermediary portion of the recording material P with respect to the feeding direction is wound about the fixing belt 301. From the above, in this embodiment, the length in which the recording material P is separated from the fixing belt 301 was set at 90 mm which is an intermediary length between these lengths of 150 mm and 40 mm.

[Position of Air Heating Portion]

Next, a position of the air heating portion 4020C which is a part of the air passage 402B will be described with reference to FIGS. 2 and 3. As described above, in this embodiment, the recording material P is peeled off from the fixing belt 301 by blowing the air from the air nozzles 401. Here, when a temperature of the blown air is low, the toner image on the recording material is cooled in some cases. The cooled toner image changes in glossiness depending on a cooling temperature, and therefore, there is a liability that the toner image causes uneven glossiness.

Particularly, in this embodiment, the air nozzle 401 is disposed so that the longitudinal direction thereof extends along the widthwise direction of the fixing belt 301, and is provided with a plurality of nozzle holes 401*a* formed in the surface opposing the fixing belt 301. In addition, by providing the plurality of nozzle holes 401*a* each having a small diameter in such a manner, the compressed air with a high air (wind) pressure and a large air volume is blown to the recording material.

On the other hand, the toner image on the recording material to which the compressed air is blown is abruptly cooled in the case where the air low in temperature is blown to the recording material. The air pressure and the air volume become higher (larger) as the toner image is closer to the nozzle holes 401*a* with respect to the widthwise direction. That is, the toner image on the recording material has a temperature distribution by cooling of the compressed air depending on positions of the nozzle holes 401*a* with respect to the widthwise direction. The cooled toner image slightly changes in glossiness depending on the cooling temperature and has a glossiness distribution with respect to the widthwise direction.

With speed-up of apparatus and diversification of media such as ultra-thin paper is recent years, in order to further enhance a peeling performance, measures such that the air nozzles 401 are further brought near to the fixing belt 301 and that the air pressure of the compressed air is increased are taken. In the case where such measures are taken, the temperature distribution of the toner image on the recording material becomes larger. As a result, the glossiness distribution depending on the temperature distribution occurs at a visually recognizable level (this phenomenon is referred to as uneven nozzle pitch). Therefore, in this embodiment, the air heating portion 4020C which is a part of the air passage 402B is disposed in the following manner, so that the air blown from the air nozzles 401 is heated and thus the above-described uneven glossiness of the toner image is suppressed.

The air heating portion 4020C is provided in a range overlapping with the fixing belt 301 in the case where the fixing belt 301 is viewed in a direction perpendicular to the widthwise direction of the fixing belt 301. Particularly, in this embodiment, the air heating portion 4020C is disposed above the fixing belt 301 with respect to the vertical direction and in a range overlapping with the fixing belt 301 in the case where the fixing belt 301 is viewed from above. In other words, the air heating portion 4020C is disposed, as shown in FIG. 2, in a silhouette S where an upper-side surface of the fixing belt 301 is projected above. Incidentally, the pipe of the air heating portion 4020C is not limited to above the fixing belt 301, but may only be required to be disposed in the range, such as a side of the fixing belt 301 with respect to a horizontal direction, overlapping with the fixing belt 301 in the case where the fixing belt 301 is viewed in the direction perpendicular to the widthwise direction.

Further, the air heating portion 4020C is disposed between the fixing belt 301 and the cover of the fixing device 8D. Incidentally, the air heating portion 4020C and the fixing belt 301 may preferably oppose each other with no obstructing material. However, the piping member 402*f* of the air heating portion 4020C may be covered with a nonwoven fabric or the like, and between the air heating portion 4020C and the fixing belt 301, for example, a member, such as a frame of the fixing device 8D or the like, shielding a part of a portion between the air heating portion 4020C and the fixing belt 301 may be provided. In the case where this shielding member is provided, it is preferable that a shielding area is small. In summary, in this embodiment, the air heating portion 4020C may only be required to be disposed at a periphery of the fixing belt 301 so that the air heating portion 4020C is heated by heat generated from the fixing belt 301.

Further, of the piping member 402*f* of the air heating portion 4020C, passage portions 402*k*1, 402*k*2, and 402*k*3 excluding a bent portion 402*j* described later are disposed, as shown in FIG. 3, along the widthwise direction crossing the recording material embodiment direction. In this embodiment, the passage portions 402*k*1, 402*k*2, and 402*k*3 are disposed substantially in parallel to the longitudinal direction of the fixing belt 301. Specifically, the passage portions 402*k*1, 402*k*2, and 402*k*3 are disposed in the cover of the fixing device 8D along the widthwise direction (Y direction) from a rear side toward a front side of the image forming apparatus 1. By this, a length in which the passage portions 402*k*1, 402*k*2, and 402*k*3 oppose the fixing belt 301 can be made longer than in the case where for example, the passage portions 402*k*1, 402*k*2, and 402*k*3 are disposed in parallel to the recording material feeding direction, so that the air passing through the passage portions 402*k*1, 402*k*2, and 402*k*3 can be efficiently heated by heat of the fixing belt 301.

A length of each of the passage portions 402*k*1, 402*k*2, and 402*k*3 may preferably be shorter than a length of the fixing belt 301 in the longitudinal direction, and may preferably be disposed so that entirety of the piping member 402*f* including the bent portion 402*j* falls within a range overlapping with the fixing belt 301 in the case where the fixing belt 301 is viewed from above. This is because in the case where a part of the piping member 402*f* is out of the range overlapping with the fixing belt 301, there is a liability that the air is cooled at the part.

The air heating portion 4020C is positioned, as shown in FIG. 2, on a downstream side of the rotational direction of the fixing belt 301 than a highest position of the fixing belt 301 with respect to the vertical direction is. By this, the air warmed at a periphery of the fixing belt 301 and flowing along the rotational direction of the fixing belt 301 blows against the air heating portion 4020C, so that the air heating portion 4020C is efficiently heated.

Particularly, in this embodiment, the fixing belt 301 is, as described above, stretched by the fixing pad 303, the heating roller 307, and the steering roller 308. Further, of these stretching members, the steering roller 308 as a second roller is disposed downstream of the heating roller 307 and upstream of the nip N (i.e., the fixing pad 303) with respect to the rotational direction of the fixing belt 301. Further, the air heating portion 4020C is disposed between the heating roller 307 and the steering roller 308 with respect to the rotational direction of the fixing belt 301. For this reason, it becomes possible that the air heated by the heating roller 307 is efficiently sent to the air heating portion 4020C side by the rotation of the fixing belt 301.

Further, in this embodiment, the steering roller 308 is positioned below the highest position (top) of the heating roller 307, and the air heating portion 4020C is positioned between the heating roller 307 and the steering roller 308 with respect to the rotational direction of the fixing belt 301. For this reason, the air heating portion 4020C can be disposed at the same highest as the top of the heating roller 307 or below the top of the heating roller 307. As a result, even when the air heating portion 4020C is disposed above the fixing belt 301, it is possible to suppress that the air heating portion 4020C protrudes above the highest position of the fixing belt 301, so that upsizing of the apparatus can be suppressed.

[Air Heating Portion]

Next, details of the above-described air heating portion 4020C will be described using FIGS. 2 and 3.

The air heating portion 4020C includes a single piping member 402*f*. The piping member 402*f* is made of metal which is a material high in thermal conductivity, and is made of an aluminum alloy as described above. Such a piping member 402*f* is a member in which the compressed air passes through, and has a cylindrical pipe shape. The piping member 402*f* is disposed opposed to the fixing belt 301 and is warmed by receiving radiation heat from the fixing belt 301 or the like provided inside the fixing device 8D. By this, the compressed air passing through the inside of a plurality of portions of the piping member 402*f* is warmed.

Further, in the case where the fixing belt 301 is viewed in a direction perpendicular to the widthwise direction, the piping member 402*f* is disposed in a range overlapping with the fixing belt 301 and is formed so that an air flowing passage makes at least one reciprocation or more in this range. In this embodiment, as described above, the piping member 402*f* is disposed above the fixing belt 301 with respect to a vertical direction, and in the case where the fixing belt 301 is viewed from above, the piping member 402*f* is disposed in the range overlapping with the fixing belt 301.

Further, the piping member 402*f* includes the bent portion 402*j* in at least one portion within the above-described range. In this embodiment, by providing the bent portion 402*j* in two portions, so that the air flowing passage through the piping member 402*f* is caused to make one and half reciprocation. That is, a single pipe made of metal is bent at two portions, so that the piping member 402*f* of which air passage makes one and half reciprocation is formed. Further, a length of the piping member 402*f* in the above-described range is made two times or more than a length of the fixing belt 301 in the widthwise direction. In other words, the piping member 402*f* includes the bent portion 402*j* in at least one portion within the above-described range, and the length of the piping member 402*f* in this range is two times or more than the length of the fixing belt 301 in the widthwise direction.

Specifically, the piping member 402*f* includes three passage portions 402*k*1, 402*k*2, and 402*k*3 and two bent portions 402*j*. That is, with respect to the widthwise direction, one end portion of the passage portion 402*kl* and one end portion of the passage portion 402*k*2 are made continuous to each other by the bent portion 402*j* on one end side. The other end portion of the passage portion 402*k* and the other end portion of the passage portion 402*k*3 are made continuous to each other by the bent portion 402*j* on the other end side.

By this, the compressed air flowing from the fixing-side coupler 402*a* into the air heating portion 4020C flows in a first direction along the widthwise direction inside the passage portion 402*kl* of the piping member 402*f* and enters the passage portion 402*k*2 after being turned by 180° C. at the bent portion 402*j* on the one end side, and then flows in a second direction opposite to the first direction along the widthwise direction inside the passage portion 402*k*. Then, the air flowed through the passage portion 402*k* is turned by 180° at the bent portion 402*j* on the other end side and enters the passage portion 402*k*3 and then flows in the first direction along the widthwise direction inside the passage portion 403*k*, so that the air is discharged into the air tube 402*c*, These passage portions 402*kl* and 402*k*2 or the passage portions 402*k*2 and 402*k*3 correspond to a first passage portion in which the air flows in the first direction and a second passage portion in which the air flows in the second direction, respectively. Further, in this embodiment, the passage portions 402*k*1, 402*k*2, and 402*k*3 opposes the fixing belt 301. That is, the passage portions 402*k*1, 402*k*2, and 402*k*3 are disposed in parallel along a stretching surface as a surface of a portion of the fixing belt 301 stretched between the heating roller 307 and the steering roller 308. Incidentally, the number of the passage portions may be two or four or more. In the case where an inlet and an outlet of the piping member 402*f* are on the same side with respect to the widthwise direction, the number of the passage portions becomes an even number, and in the case where the inlet and the outlet of the piping member 402*f* are on opposite sides with respect to the widthwise direction, the number of the passage portions becomes an odd number of three or more.

In the case of the thus-constituted this embodiment, in a constitution in which the recording material is peeled off from the fixing belt 301 by blowing the air to the recording material, it is possible to suppress occurrence of uneven glossiness on the toner image. That is, in the case of this embodiment, the piping member 402*f* of the air heating portion 4020C which is a part of the air passage 402B is disposed above the fixing belt 301. For this reason, the air heated by the fixing belt 301 is raised, so that the plurality of portions of the piping member 402*f* is heated by this air. Particularly, in this embodiment, the air flowing passage through the piping member 402*f* is caused to make one reciprocation or more (specifically, one and half reciprocation). For this reason, the air flowing into the air heating portion 4020C flows so as to make reciprocation in the heated piping member 402*f*, and thus is efficiently heated. That is, in the air heating portion 4020C, the air is caused to flow and is turned, so that a distance in which the air flows within a region opposing the fixing belt 301 can be made long, with the result that a time in which the air passes through the passages in the neighborhood of the fixing belt 301 can be made long. By this, the air can be efficiently warmed. In the case of this embodiment, during operation of the image forming apparatus 1, the plurality of portions of the piping member 402*b* are heated to about 80 to 100° C. by the heat from the fixing belt 301. Then, the air flowing inside the piping member 402*f* is also heated, so that it is possible to blow warm air from the air nozzles 401 toward the recording material. As a result, a temperature distribution generated by the air blown from the air nozzles 401 can be made small, so that the occurrence of the uneven glossiness can be suppressed.

Other Examples of First Embodiment

Here, other two examples of the first embodiment will be described using FIGS. 6 and 7. FIG. 6 shows another first example, and FIG. 7 shows another second example. In the case of an air passage 402C of a fixing device 8E, a piping member 402 ***f*1 constituting an air heating portion 4020D is changed in bending direction from the above-described constitution. Specifically, the piping member 402***f* includes a plurality of passage portions 402*m* in which the air flows along a crossing direction (which is the rotational direction of the fixing belt 301 and a direction along the stretching surface 301*a* in this embodiment) crossing the widthwise direction, and includes a plurality of bent portions 402*j*.

That is, the piping member 402*f*1 includes the plurality of passage portions 402*m* such that adjacent end portions thereof are made continuous to each other so as to be turned by the bent portion 402*j* therebetween, so that as shown in FIG. 6, the piping member 402*f*1 has a single passage in which the piping member 402*f*1 is disposed along the widthwise direction while being turned at a plurality of portions.

In the case of such a first example, the air flowing through the piping member 402*f*1 makes one reciprocation with respect to the crossing direction. Further, of the plurality of passage portions 402*m*, an arbitrary passage portion 402*m* corresponds to a third passage portion in which the air flows in a third direction along the crossing direction, and the passage portion 402*m* adjacent to this arbitrary passage portion 402*m* corresponds to a fourth passage portion in which the air flows in a fourth direction, opposite to the third direction, along the crossing direction. The plurality of the passage portions 402*m* oppose the fixing belt 301.

Also, in the case of such a first example, when the fixing belt 301 is viewed in the direction perpendicular to the widthwise direction, the piping member 402*f*1 includes the bent portion 402*j* in at least one portion within the range overlapping with the fixing belt 301. Further, a length of the piping member 402*f*1 in this range is made longer than a length of the fixing belt 301 with respect to the widthwise direction by two times or more. Other points are similar to those in the above-described first embodiment.

On the other hand, in the case of an air passage 402D of a fixing device 8F shown in FIG. 7, a piping member 402*f*2 constituting an air heating portion 4020E is formed in a spiral shape and is a single passage disposed along the widthwise direction. In the case of such a second example, when the piping member 402*f*2 is viewed in the direction perpendicular to the widthwise direction of the fixing belt 301, the piping member 402*f*2 includes the bent portion in at least one portion within the range overlapping with the fixing belt 301. Further, a length of the piping member 402*f*2 in this range is made longer than the length of the fixing belt 301 with respect to the widthwise direction by two times or more. Other points are similar to those in the above-described first embodiment. Also, in the above-described first and second examples, similarly as in the above-described first embodiment, a time in which the air passes through the passages in the neighborhood of the fixing belt 301 can be made long, so that the air can be warmed efficiently.

Embodiment

An experiment conducted for confirming an effect of the above-described constitution of this embodiment will be described.

In the experiment, a temperature distribution on the recording material in the case where the air is blown from the air nozzles 401 to the recording material was measured in each of an embodiment in which an air heating portion 4020C including the bent piping member 402*f* is disposed above the fixing belt 301 as in the above-described this embodiment and a comparison example in which the piping member 402*f* is not disposed above the fixing belt 301.

In the embodiment, the compressed air ejected from the air nozzle 401 passes through the piping member 402*f* heated to about 80 to 100° C., and thus is heated up to about 60 to 70° C. Further, the compressed air is somewhat cooled by passing through the air tube 402*c* and the tube joint 402*d* which are positioned downstream of the piping member 402*b*, and thus the temperature of the compressed air lowers to about 42° C., so that the compressed air is guided to an inside space of the air nozzle 401 through the air nozzle inlet opening 401*b*. On the other hand, in the case where the portion heated by the fixing belt 301 is not provided in an air passage 402A as in the comparison example, into the air nozzles 401, the compressed air of about 30° C. is guided.

FIG. 8 shows a temperature distribution on the recording material P immediately after the compressed air is blown onto the recording material P in each of the embodiment and the comparison example. As shown in FIG. 8, with a distance closer to a position of an associated nozzle hole 401*a* of the air nozzle 401, a larger degree of a lowering in temperature of the recording material P occurred. As in the comparison example, in the case where a CAT ("C.A.T.") of the compressed air guided to the air nozzle 401 was 30° C., a different ΔT between a maximum temperature portion and a minimum temperature position which are adjacent to each other was 19.0° C. at the maximum. On the other hand, in the case of the embodiment, the compressed air temperature ("C.A.T.") of the compressed air guided to the air nozzle 401 was 42° C., and AT was 9.3° C. at the maximum. Thus, as is apparent from FIG. 8, in this embodiment, a glossiness distribution generated on the toner image on the recording material P is suppressed, so that a level of uneven nozzle pitch can be improved to a visually unrecognizable level.

Second Embodiment

A second embodiment will be described using FIGS. 9 and 10. In the above-described first embodiment, the case where the fixing member is the fixing belt 301 was described. On the other hand, in this embodiment, the fixing member was changed to a fixing roller 310. Other constitutions and actions are similar to those in the first embodiment and therefore, similar constitutions are represented by the same reference numerals or symbols and are omitted from description and illustration or briefly described. In the following a difference from the first embodiment will be principally described.

A fixing device 8G in this embodiment includes the fixing roller 310 as the fixing member and the rotatable heating member, and the fixing roller 310 forms a nip N in press-contact with the pressing roller 305.

The fixing roller 310 includes a core metal which is, for example, 77 mm in outer diameter, 6 mm in thickness, and 350 mm in length and which is made of a cylindrical metal (aluminum in this embodiment). On the core metal, as a heat-resistant elastic layer, a silicone rubber (JIS-A hardness of 20 degrees in this embodiment) is coated in a thickness of 1.5 mm. On the elastic layer, in order to improve a parting property from the toner, as a heat-resistant parting layer, a fluorine-containing resin material (PFA tube in this embodiment) is coated in a thickness of 50 μm.

The fixing roller 310 is rotatably supported by an unshown frame of the fixing device 8G, and is configured so as to be rotationally driven at a predetermined peripheral speed by an unshown driving source. Further, inside the fixing roller 310, a halogen heater 306 as a heating portion is provided, and is capable of generating heat up to a predetermined temperature.

The air nozzle 401 and the air passage in this embodiment are similar to those in the first embodiment. Further, also, in the case of this embodiment, when the fixing belt 301 is viewed in the direction perpendicular to the widthwise direction of the fixing roller 310, the air heating portion 4020C as a passage of the air passage 402B is disposed in the range overlapping with the fixing roller 310. Incidentally, in this embodiment, the air heating portion 4020C is positioned above the fixing roller 310 with respect to the vertical direction, and in the case where the fixing roller 310 is viewed from above with respect to the vertical direction, a passage of the air heating portion 4020C is out of the range overlapping with the fixing roller 310, but even when the fixing roller 310 is viewed from above, entirety of the air heating portion 4020C may be disposed in the range overlapping with the fixing roller 310. Further, the air heating portion 4020C is disposed between the fixing roller 310 and a cover of the fixing device 8G similarly as in the first embodiment.

Further, the passage portions 402*kl* to 402*k*3 of the piping member 402*f* of the air heating portion 4020C are disposed along the widthwise direction crossing the feeding direction of the recording material, and are positioned downstream, with respect to the rotational direction of the fixing roller 310, of a highest position (top) of the fixing roller 310 with respect to the vertical direction. Further, also, in the case of this embodiment, similarly as in the first embodiment, the piping member 402*f* is made of metal, particularly an aluminum alloy.

Also, in the case of the thus-constituted this embodiment, in a constitution in which the recording material is peeled off from the fixing roller 310 by blowing the air to the recording material, it is possible to suppress occurrence of uneven glossiness on the toner image. That is, also, in the case of this embodiment, the piping member 402*f* of the air heating portion 4020C which is a part of the air passage 402B is disposed above the fixing roller 310. Further, the air flowing passage through the piping member 402*f* is caused to make one reciprocation or more (specifically, one end half reciprocation). For this reason, the air heated by the fixing roller 310 is raised, so that the plurality of portions of the piping member 402*f* are heated by this air. Then, the air flowing inside the piping member 402*f* is also heated, so that it is possible to blow warm air from the air nozzles 401 toward the recording material. As a result, a temperature distribution generated by the air blown from the air nozzles 401 can be made small, so that the occurrence of the uneven glossiness can be suppressed.

Third Embodiment

A third embodiment will be described. As shown in FIG. 11, in the third embodiment, a constitution in which an air heating portion 4020 includes a heating portion main body 4021 and a pair of passage changing members 4022 is employed. The heating portion main body 4021 includes a plurality of piping members made of metal. In this embodiment, the number of the piping members 402*f* is three, but may also be two or four or more. The plurality of piping members 402*f* are disposed in parallel along a surface of a portion of the fixing belt 301 stretched between the heating roller 307 and the steering roller 308.

The plurality of piping members 402*f* are made of metal which is a material high in thermal conductivity.

Each of the plurality of piping members 402*f* is, as described above, disposed along the widthwise direction, and the passage changing members 4022 are provided in a pair separately from the plurality of piping members 402*f* so as to be connected to the plurality of piping members 402*f* in opposite portions, respectively, with respect to the widthwise direction. Further, the passage changing members 4022 are connected to the plurality of piping members 402*f* and change a direction of a passage in which the air flows from either one of the plurality of piping members 402*f* toward another one of the plurality of piping members 402*f*. That is, the passage changing members 4022 connect the plurality of piping members 402*f* to each other at opposite end portions of the heating member main body 4021 and bend the air passage. In this embodiment, the air passage is turned 180° by the passage changing members 4022. The passage changing members 4022 are formed of a material different from a material of the piping members 402*f*.

Each of such passage changing members 4022 includes a connecting portion 403 made of resin and a closing (blocking) member 404 made of metal. The connecting portion 403 is, as shown in FIG. 13, integrally provided with a plurality of connecting openings 403*a* connected to the plurality of piping members 402*f*, and is provided with an opening 403*b* on a side opposite from the plurality of connecting openings 403*a*. The number of the connecting openings 403*a* is the same as the number of the piping members 402*f* and is three in this embodiment. The connecting portion 403 is inserted into end portions of the plurality of piping members 402*f* through the plurality of connecting openings 403*a*, so that the connecting portion 403 is connected to the plurality of piping members 402*f*. Further, between each of the plurality of connecting openings 403*a* and each of the plurality of piping members 402*f*, for example, a seal member such as a rising made of a rubber is provided. By this, leakage of air at a connecting portion between the connecting opening 403*a* and the piping member 402*f* is suppressed.

The closing member 404 closes the opening 403*b* of the connecting portion 403. Also, between the closing member 404 and the connecting portion 403, a seal member is provided, so that leakage of the air at this portion is suppressed. For example, as the seal member, a double-side tape is provided between the closing member 404 and the connecting portion 403, so that the closing member 404 is fixed to the connecting portion 403 through this double-side tape. In this embodiment, in addition, the closing member 404 and the connecting portion 403 are fixed by screws.

An inside space of the connecting portion 403 closed by the closing member 404 is provided with a partitioning member 403*c* so as to partition between a central connecting opening 403*a* and a one-side connecting opening 403*a* with respect to an arrangement direction of the three connecting openings 403*a* and so as not to permit communication between these connecting openings 403*a*. On the other hand, there is no partitioning member between the central connecting opening 403*a* and the other-side connecting opening 403*a*, so that these connecting openings 403*a* communicate with each other.

That is, as regards a right-side passage changing member 4022 of FIG. 13, an upper-side connecting opening 403*a* and the central connecting opening 403*a* in FIG. 13 communicate with each other, and the partitioning member 403*c* is provided between a lower-side connecting opening 403*a* and the central connecting opening 403*a* in FIG. 13. On the other hand, as regards a left-side passage changing member 4022 of FIG. 13, a lower-side connecting opening 403*a* and the central connecting opening communicate which each other, and the partitioning member 403*c* is provided between an upper-side connecting opening 403*a* and the central connecting opening 403*a*.

Further, as shown in FIG. 12, to each of the passage changing members 4022 on opposite sides, an air tube 402*c* is connected. Specifically, to the right-side passage changing member 4022 in FIGS. 12 and 13, the air tube 402*c* is connected so as to communicate with the lower-side connecting opening 403*a*, so that the air flows from this air tube 402*c* into the right-side passage changing member 4022. Further, to the left-side passage changing member 4022 in FIGS. 12 and 13, the air tube 402*c* is connected so as to communicate with the upper-side connecting opening 403*a*, so that the air is discharged from the left-side passage changing member 4022 to this air tube 402*c*.

By this, as indicated by arrows in FIG. 13, the air flows in the air heating portion 4020. That is, in this embodiment, the compressed air flowed from the fixing-side coupler 402*a* into the air heating portion 4020 flows an inside of the plurality of piping members 402*f* and the passage changing members 4022 so as to make reciprocation between the left and right passage changing members 4022 in FIG. 13. Further, in this embodiment, the compressed air flowed into the air heating portion 4020 makes one and half reciprocation, and then is discharged from the air heating portion 4020 to the air tube 402*c*.

The above-described passage changing member 4022 is at least partially made of resin. In this embodiment, the connecting portion 403 is formed of a heat-resistant resin material, and the closing member 404 is a plate-like member made of metal, i.e., a metal plate. The closing member 404 may be made of resin similarly as the connecting portion 403. In this embodiment, the air heating portion 4020 is fixed to the frame of the fixing device 8B through the closing member 404, and therefore, the closing member 404 is formed with the metal plate in consideration of ease of fixing. Specifically, as shown in FIG. 12, each of the closing members 404 has a constitution in which a main body portion 404*a* closing the opening 403*b* of the connecting portion 403 and a fixing portion 404*b* for being fixed to the frame are provided by bending the metal plate. Incidentally, the connecting portion 403 and the closing member 404 may be formed integrally with each other.

In the case of the thus-constituted this embodiment, in a constitution in which the recording material is peeled off from the fixing belt 301 by blowing the air to the recording material, it is possible to suppress occurrence of uneven glossiness on the toner image. That is, in the case of this embodiment, the plurality of piping members 402*f* of the air heating portion 4020 which are a part of the air passage 402A are made of metal and are disposed above the fixing belt 301. For this reason, the air heated by the fixing belt 301 is raised, so that the plurality of portions of the piping member 402*f* is heated by this air. Particularly, in this embodiment, air heating portion 4020 is constituted by the plurality of piping members 402*f* and the pair of passage changing members 4022 connected to the piping members 402*f* at opposite portions. For this reason, the air flowing into the air heating portion 4020C flows so as to make reciprocation in the plurality of heated piping members 402*f*, and thus is efficiently heated. That is, in the air heating portion 4020C, the air is caused to flow and is turned, so that a distance in which the air flows within a region opposing the fixing belt 301 can be made long, with the result that a time in which the air passes through the passages in the neighborhood of the fixing belt 301 can be made long. By this, the air can be efficiently warmed. In the case of this embodiment, during operation of the image forming apparatus 1, the plurality of portions of the piping member 402*b* are heated to about 80 to 100° C. by the heat from the fixing belt 301. Then, the air flowing inside the plurality of piping members 402*f* is also heated, so that it is possible to blow warm air from the air nozzles 401 toward the recording material. As a result, a temperature distribution generated by the air blown from the air nozzles 401 can be made small, so that the occurrence of the uneven glossiness can be suppressed.

Here, as a constitution in which the air is intended to be heated efficiently by providing a passage such that the passage of the compressed air is turned as described above, constitutions as shown in FIGS. 14 and 15 would be considered. First, as a comparison example 1 shown in FIG. 14, it would be considered that a passage such that the air flowing an inside makes reciprocation is formed as an air heating portion 4020A by bending a single metal pipe. However, in the case of this constitution, in order to bend the metal pipe, there is a need that a size of an R portion in FIG. 14 is made a certain size or more (for example, R=25 mm or more) for convenience of manufacturing. By doing so, the air heating portion 4020A becomes large, with the result that an apparatus becomes large.

Further, as a comparison example 2, a constitution shown in FIG. 15 would be considered. An air heating portion 4020B shown in FIG. 15 has a constitution including a first member 405*a* of which entire passage is formed while being arranged so as to bring turned passage potions near to each other in order to reduce a size of the air heating portion 4020B and including a second member 405*b* for sealing the passage. However, in the case of this constitution, air pressure due to the compressed air of an entire flow passage is received in a direction in which the first member 405*a* and the second member 405*b* are separated from each other. For this reason, there is a liability that a sealing performance of the passage is impaired, such as leakage of the air from between the first member 405*a* and the second member 405*b*.

On the other hand, the air heating portion 4020 in this embodiment is constituted by connecting the pair of passage changing members 4022 with the plurality of piping members 402*f* at opposite end portions. For this reason, the sealing performance of the passage can be ensured while suppressing upsizing of the air heating portion 4020. That is, in this embodiment, the passage of the compressed air can be abruptly turned by the passage changing members 4022, and therefore, the plurality of piping members 402*f* can be disposed close to each other. By disposing the plurality of piping members 402*f* close to each other, the piping members 402*f* can be disposed concentratedly in a place where heating efficiency is good. Further, the size of the air heating portion 4020 can be made smaller than the size of the air heating portion 4020A in the comparison example 1 shown in FIG. 14, so that upsizing of the apparatus can be suppressed.

Further, the pair of passage changing members 4022 is connected to the plurality of piping members 402*f* at their opposite end portions with respect to the widthwise direction and therefore, an area in which the pressure is received from the compressed air flowing the inside of the piping members 402*f* can be made smaller than an area in the comparison example 2 shown in FIG. 15. As a result, the sealing performance of the passage is easy to be ensured. Thus, in the case of the air heating portion 4020 in this embodiment, the sealing performance of the passage can be ensured while suppressing the upsizing of the apparatus, and it is possible to efficiently heat the air flowing the inside of the air heating portion 4020.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-166246 filed on Oct. 17, 2022, 2022-166248 filed on Oct. 17, 2022, and 2022-166249 filed on Oct. 17, 2022, which are hereby incorporated by reference herein in their entirety.

What is claimed is:

1. An image forming apparatus comprising:

a first rotatable member configured to heat a toner image formed on a recording material;

a second rotatable member configured to form a nip in contact with the first rotatable member, wherein the second rotatable member applies heat and pressure to the recording material, on which the toner image is carried, in the nip in cooperation with the first rotatable member to fix the toner image on the recording material;

an air nozzle configured to blow air toward the recording material and the first rotatable member on a side downstream of the nip with respect to a feeding direction of the recording material; and a pipe configured to send air to the air nozzle and opposing the first rotatable member, wherein the pipe includes at least one bent portion provided in a range overlapping with the first rotatable member in a case that when a direction crossing the feeding direction of the recording material fed in the nip is a widthwise direction of the first rotatable member, the pipe is viewed in a direction perpendicular to the widthwise direction.

2. An image forming apparatus according to claim 1, wherein the pipe is provided along the direction crossing the feeding direction of the recording material fed in the nip while being turned at a plurality of portions.

3. An image forming apparatus according to claim 1, wherein the pipe is formed in a spiral shape along the direction crossing the feeding direction of the recording material fed in the nip.

4. An image forming apparatus according to claim 1, wherein the pipe is a metallic pipe of which surface is metal.

5. An image forming apparatus according to claim 4, wherein the metallic pipe is provided above the nip with respect to a vertical direction.

6. An image forming apparatus according to claim 4, wherein the portion is provided over one end to the other end of the first rotatable member with respect to the widthwise direction.

7. An image forming apparatus according to claim 1, wherein further comprising a compressor configured to discharge the air, compressed by the compressor, from the air nozzle.

8. An image forming apparatus according to claim 7, wherein the compressor is provided on a rear side of the image forming apparatus than the first rotatable member is.

9. An image forming apparatus according to claim 8, wherein a connecting position between the air nozzle and the pipe is on a front side of the image forming apparatus than the second rotatable member is.

10. An image forming apparatus according to claim 1, wherein the first rotatable member is a belt.

11. An image forming apparatus according to claim 1, further comprising a heating roller configured to stretch and heat the belt, wherein with respect to a rotational direction of the first rotatable member, the pipe is provided between the heating roller and the nip.

12. An image forming apparatus according to claim 1, wherein with respect to the widthwise direction, the air nozzle is provided with a plurality of holes through which the air is blown out.

13. An image forming apparatus according to claim 1, wherein a length of the pipe in a range overlapping with the first rotatable member is twice or more of a length of the first rotatable member in the direction crossing the feeding direction of the recording material fed in the nip of the first rotatable member.

* * * * *